United States Patent
Ashwood-Smith

(10) Patent No.: US 10,540,370 B2
(45) Date of Patent: Jan. 21, 2020

(54) SELF-BALANCING BINARY SEARCH CAPABLE DISTRIBUTED DATABASE

(71) Applicant: Huawei Technologies Co., Ltd., Shenzhen (CN)

(72) Inventor: Peter James Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 305 days.

(21) Appl. No.: 15/633,340

(22) Filed: Jun. 26, 2017

(65) Prior Publication Data
US 2018/0373771 A1    Dec. 27, 2018

(51) Int. Cl.
| | | |
|---|---|---|
| G06F 17/00 | (2019.01) | |
| G06F 16/27 | (2019.01) | |
| G06F 9/50 | (2006.01) | |
| G06F 12/06 | (2006.01) | |
| G06F 16/21 | (2019.01) | |

(52) U.S. Cl.
CPC ............ *G06F 16/27* (2019.01); *G06F 9/5027* (2013.01); *G06F 12/06* (2013.01); *G06F 16/21* (2019.01)

(58) Field of Classification Search
CPC ........ G06F 9/5027; G06F 16/06; G06F 16/21; G06F 16/27
USPC ....................................................... 707/736
See application file for complete search history.

(56) References Cited

U.S. PATENT DOCUMENTS

| | | | | |
|---|---|---|---|---|
| 8,090,046 | B2 * | 1/2012 | Yang | H03M 7/30 375/295 |
| 9,338,126 | B2 * | 5/2016 | Brady | H04L 51/38 |
| 9,363,224 | B2 * | 6/2016 | Brady | H04L 51/38 |
| 2010/0312749 | A1 | 12/2010 | Brahmadesam et al. | |
| 2011/0119287 | A1 * | 5/2011 | Chen | H04L 67/10 707/768 |
| 2011/0246503 | A1 * | 10/2011 | Bender | G06F 9/546 707/769 |
| 2013/0007008 | A1 | 1/2013 | Yuan et al. | |
| 2015/0169253 | A1 | 6/2015 | Donlan | |
| 2015/0370860 | A1 * | 12/2015 | Bender | G06F 9/546 707/609 |

(Continued)

FOREIGN PATENT DOCUMENTS

CN          104809129 A     7/2015

*Primary Examiner* — Jean M Corrielus
(74) *Attorney, Agent, or Firm* — BCF LLP

(57) ABSTRACT

A self-balancing binary search capable distributed database (DB) includes a number of computing devices associated with a communication system and/or network. Each of the respective computing devices forming the distributed DB stores a subset of the overall information included within the distributed DB. Based on keys of key-value pairs (KVPs) stored in the computing devices, the computing devices are arranged logically to form a sorted key-ordered ring such that each computing device includes KVPs with keys higher than a predecessor computing device and lower than a successor computing device. A requested KVP query is made to any computing device in the distributed DB, which may include generating and transmitting another query to one or more other computing devices until the requested KVP is found. The distributed DB performs balancing operations moving the KVPs from computing devices with higher storage usage to computing devices with lower storage usage.

16 Claims, 12 Drawing Sheets

(56) References Cited

U.S. PATENT DOCUMENTS

| | | | |
|---|---|---|---|
| 2016/0197831 A1* | 7/2016 | De Foy | H04L 45/7453 |
| | | | 370/392 |
| 2016/0239541 A1* | 8/2016 | Chen | H04L 67/10 |
| 2016/0323385 A1 | 11/2016 | Wang | |
| 2019/0050440 A1* | 2/2019 | Novak | G06Q 10/10 |
| 2019/0149365 A1* | 5/2019 | Chatterjee | H04L 25/0226 |
| | | | 370/329 |
| 2019/0174449 A1* | 6/2019 | Shan | H04W 60/04 |

* cited by examiner

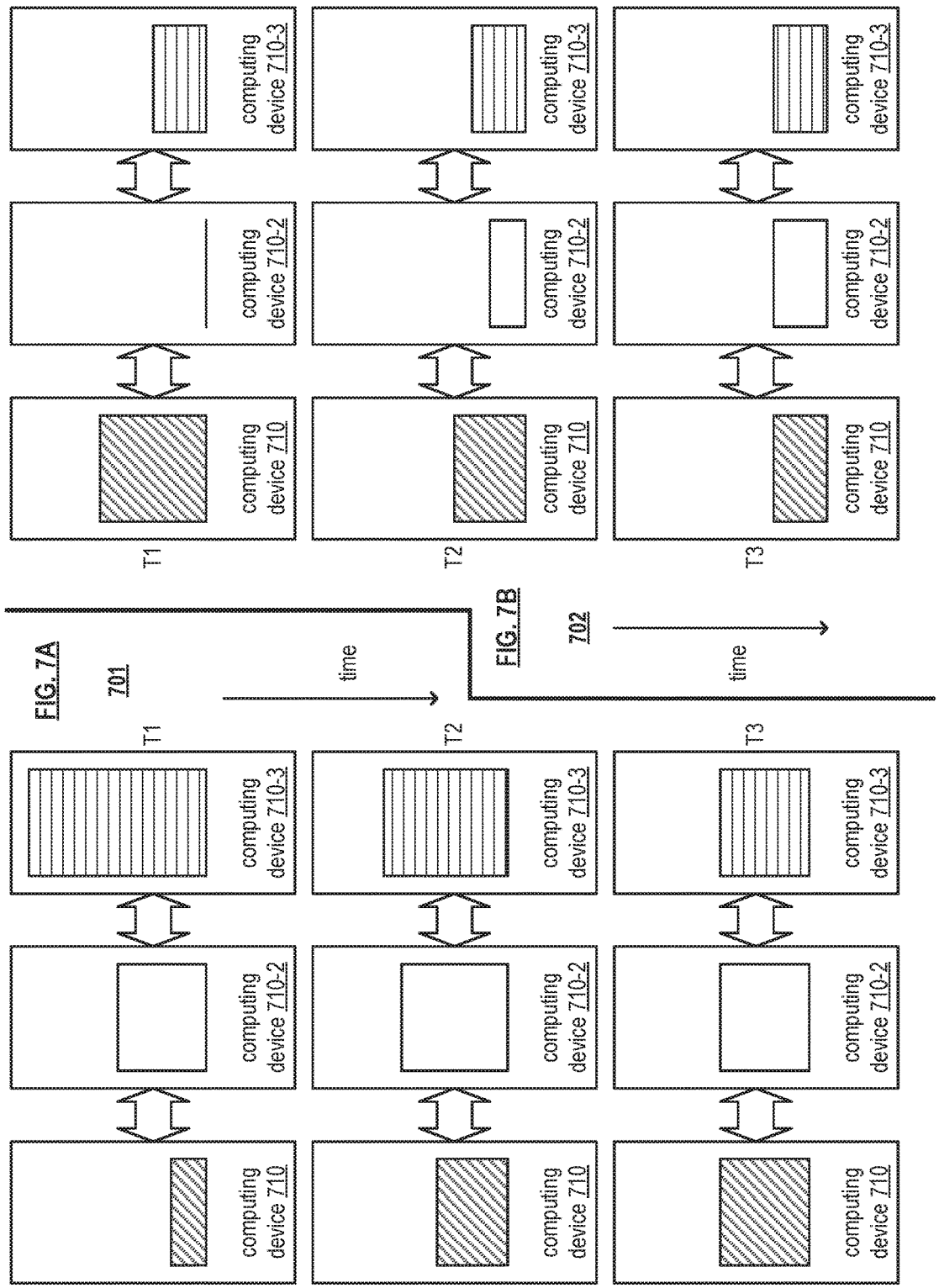

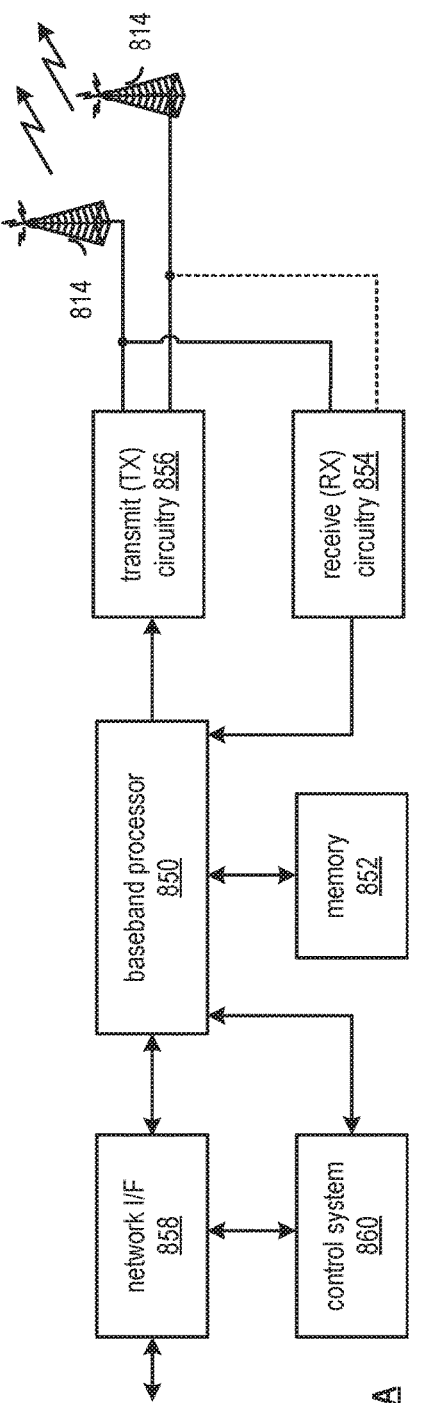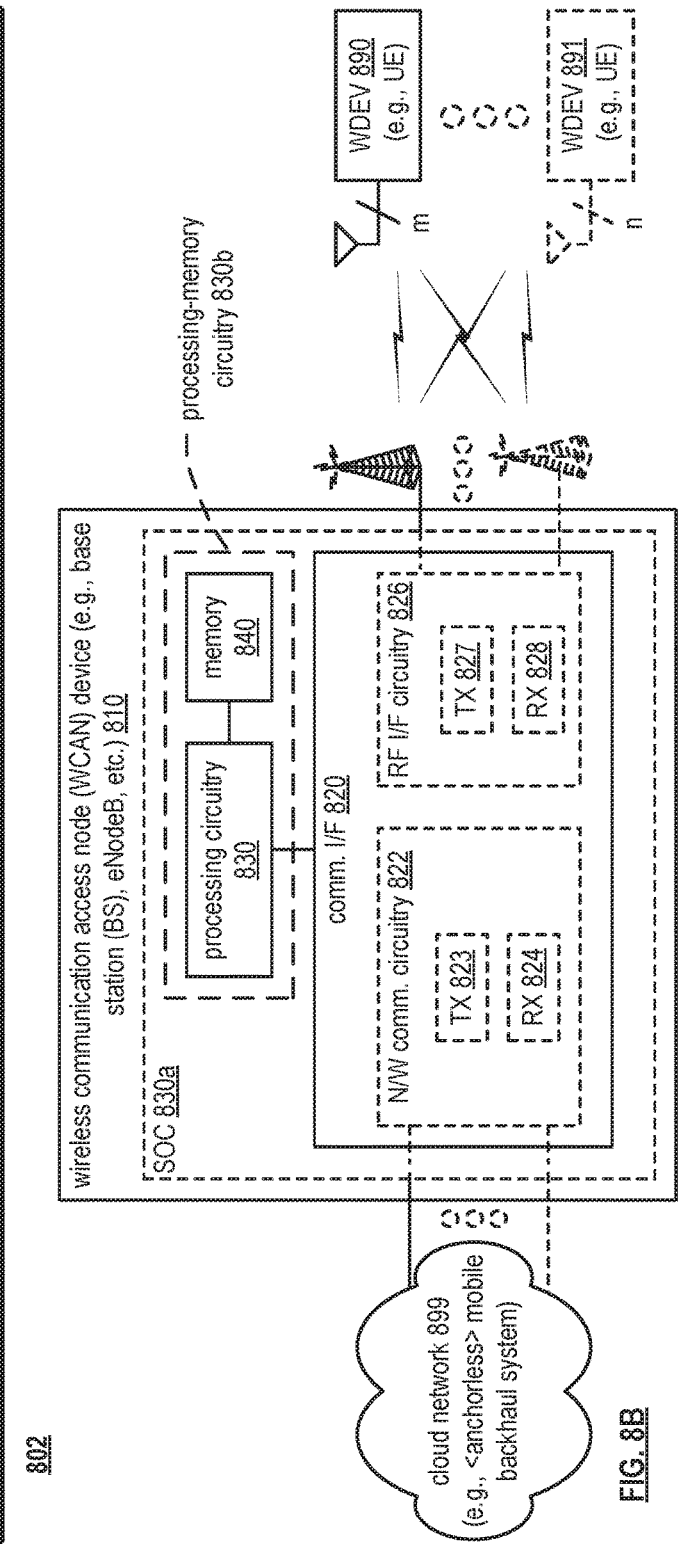

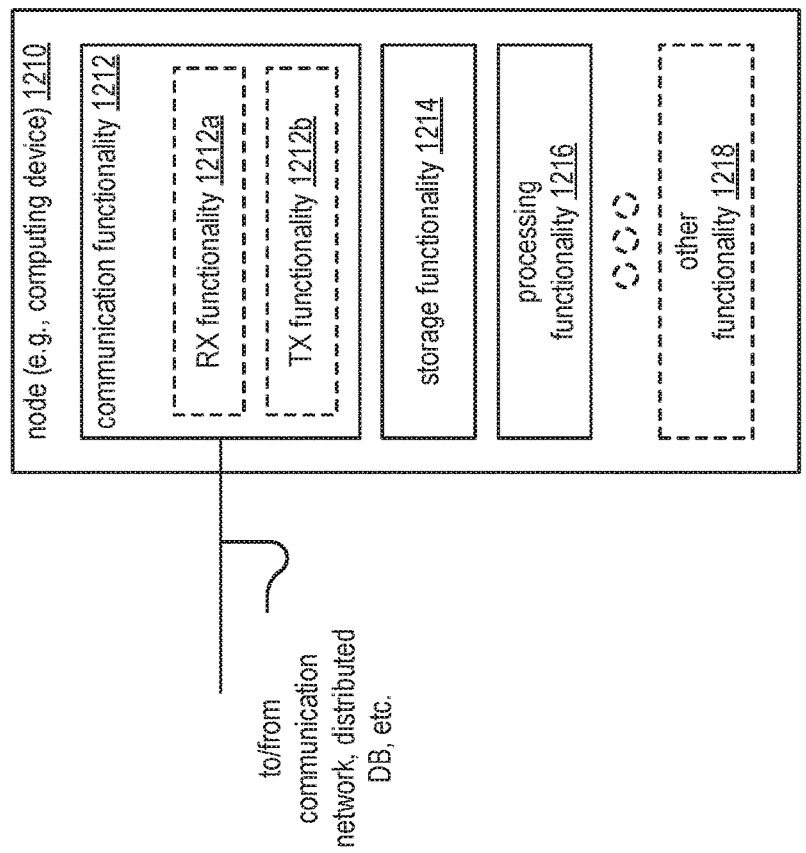

SELF-BALANCING BINARY SEARCH CAPABLE DISTRIBUTED DATABASE

CROSS-REFERENCE TO RELATED PATENTS/PATENT APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND

Technical Field

The present disclosure relates generally to communication systems; and, more particularly, to distributed database storage of information within such communication systems.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof. Different wireless communication systems may support different types of communications such as data communications and/or voice communications.

In addition, some communication systems include databases (DBs) therein that store various types of information. DBs can be implemented to store a variety of information (e.g., user data, user account information, and/or other information). As the size of such DBs increase in size, the prior art fails to provide adequate means for management of such DBs and for searching and locating such information in such DBs. For example, some DBs can include multiple millions (or billions, or more) of entries. The prior art does not provide adequate means by which such large DBs can be searched in an acceptably fast manner to ensure other portions of the communication system do not suffer performance degradation.

BRIEF SUMMARY

It is an object of embodiments disclosed within the application to provide methods and structures to implement a distributed database (DB) across a number of computing devices associated with a communication network. It is another object of embodiments disclosed within the application to provide methods and structures to effectuate balancing operations related to storage within the various computing devices that implement the distributed DB.

Note that there may be other devices within or associated with the communication network (or alternatively referred to as communication system, such terms of which may be used interchangeably herein) besides those that implemented the distributed DB. For example, some computing devices are implemented to perform storage of information including the information associated with the distributed DB, yet there may be other computing devices within or associated with the communication network as well. The distributed DB may store information that is used as part of the operation of the communication network. As one example, the distributed DB may store key-value pairs corresponding to User Equipments (UEs) associated with a mobile communication network. For example, the keys of the key-value pairs may correspond to unique identifiers used to identify each of the respective UEs from other of the UEs, and the values of the key-value pairs may correspond to current locations of the UEs within the mobile communication network. In general, any of a variety of types of desired information may be categorized in accordance with a key-value pair relationship and stored in a distributed DB implemented as described herein.

According to one aspect of the present disclosure, a computing device in the distributed DB stores (e.g., in the memory of that computing device) a subset of key-value pairs corresponding to a subset of device identifiers associated with the communication network. The subset of the key-value pairs includes keys that are greater than keys of a predecessor subset of key-value pairs stored within a predecessor computing device and that are lower than keys of a successor subset of the key-value pairs stored within a successor computing device based on a sorted key-order of the computing devices within the communication network.

According to another aspect of the present disclosure, searching for a particular key-value pair among the computing devices is made by any computing device of the distributed DB receiving a query for a requested key-value pair (e.g., from a requesting computing device). If the initial computing device that receives the query for the requested key-value pair actually stores that requested key-value pair, it returns the requested key-value pair (e.g., to the requesting computing device).

According to certain optional aspects of the present disclosure, if the initial computing device that receives the query for the requested key-value pair actually does not store that requested key-value pair, it generates another query for the requested key-value pair and transmits it to another one of the computing devices. In some instances, when the key of the requested key-value pair is less than keys of a subset of the key-value pairs in computing device, the computing device generates another query for the requested key-value pair and transmits it to a first other computing device that includes a first other subset of key-value pairs that are lower than keys of a predecessor subset of the key-value pairs stored within the predecessor computing device when the key of the requested key-value pair is less than keys of the subset of the key-value pairs in the memory.

According to certain other optional aspects of the present disclosure, when the key of the requested key-value pair is less than keys of a subset of the key-value pairs in computing device, the computing device generates another query for the requested key-value pair and transmits it to a second other computing device that includes a second other subset of the key-value pairs that are greater than keys of the successor subset of the key-value pairs stored within the successor computing device when the key of the requested key-value pair is greater than keys of the subset of the key-value pairs in the memory. The search process continues generating and transmitting additional messages among the various computing devices in an intelligent manner until the computing device that actually stores that requested key-value pair is identified, and that computing device returns the requested key-value pair (e.g., to the requesting computing device).

According to certain other optional aspects of the present disclosure, a self-balancing binary search capable distributed database (DB) includes a number of computing devices associated with a communication system and/or network. Each of the respective computing devices forming the distributed DB stores a subset of the overall information included within the distributed DB. Based on keys of key-value pairs stored in the computing devices, the computing devices are arranged logically to form a sorted key-ordered ring such that each computing device includes key-value pairs with keys higher than a predecessor computing device and lower than a successor computing device. A requested key-value pair query is made to any computing device in the distributed DB, which may include generating another query (e.g., based on and/or in response to a prior, received query) and transmitting it to one or more other computing devices until the requested key-value pair is found. The distributed DB performs balancing operations moving the key-value pairs from computing devices with higher storage usage to computing devices with lower storage usage.

It will be understood that embodiments described above may be applied to the aspects with which they are described, but in some implementations may also be applied in conjunction with each other, or may even be applied with aspects to which they were not described as being immediately related to.

BRIEF DESCRIPTION OF THE SEVERAL VIEWS OF THE DRAWINGS

FIG. 6 is a diagram illustrating another embodiment of at least a portion of communication system that includes a distributed database implemented across multiple computing devices including removal of a computing device there from.

FIG. 7A is a diagram illustrating an example of balancing operations as performed among computing devices within a distributed database implemented across multiple computing devices.

FIG. 7B is a diagram illustrating another example of balancing operations as performed among computing devices within a distributed database implemented across multiple computing devices.

FIG. 8A is a diagram illustrating an embodiment of a WCAN device.

FIG. 8B is a diagram illustrating another embodiment of a WCAN device.

FIG. 12 is a diagram illustrating an embodiment of a node device and corresponding functionality as may be implemented within a communication system.

DETAILED DESCRIPTION

Figure 1:
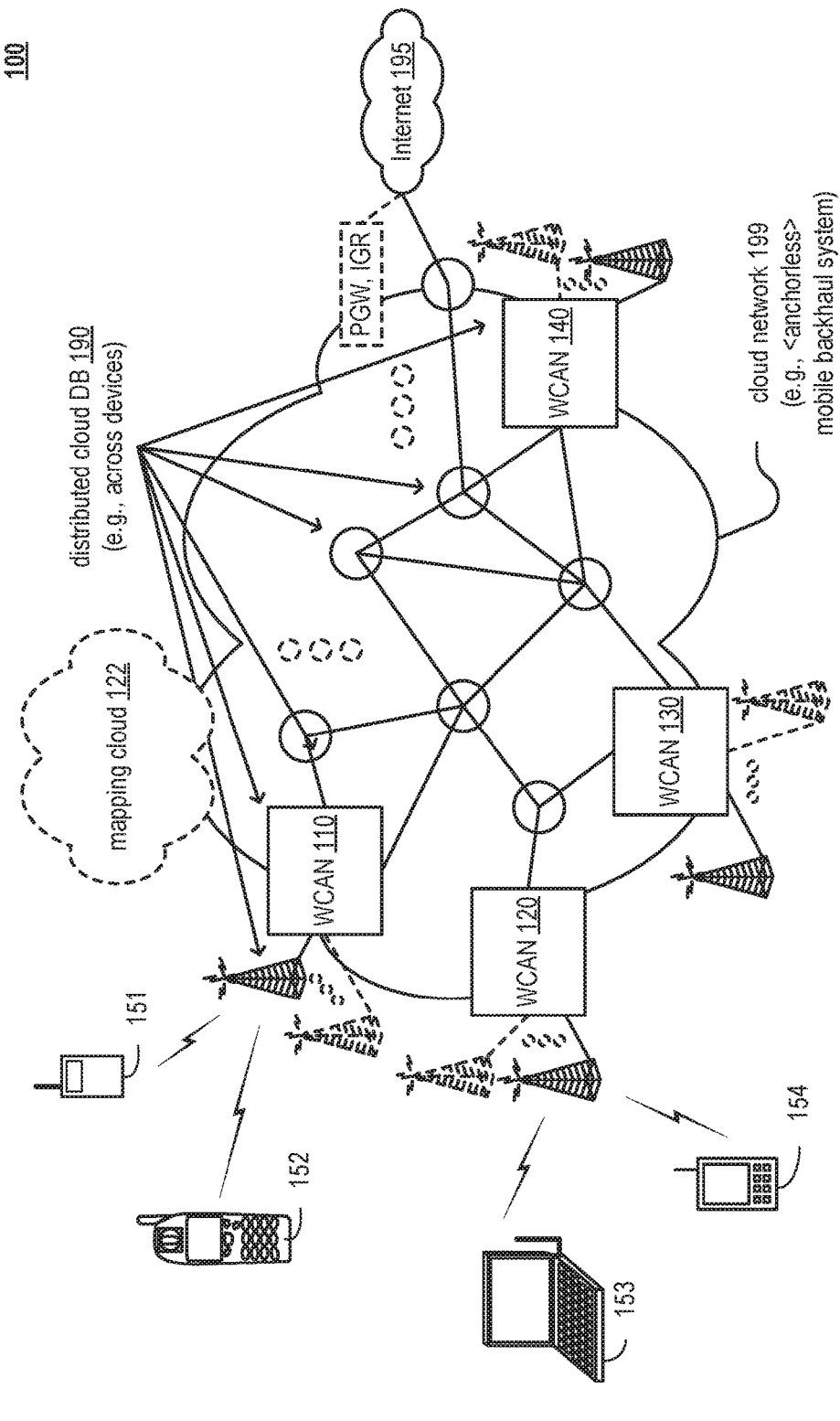
FIG. 1 is a diagram illustrating an embodiment of a communication system that is configured to service wireless communication devices.

FIG. 1 is a diagram illustrating an embodiment 100 of a communication system that is configured to serve wireless communication devices. The communication system of this diagram includes wireless communication access node (WCAN) devices 110, 120, 130, and 140, and electronic devices (EDs) configured to connect to and communicate with the WCAN device(s), such as wireless communication devices 151, 152, 153, and 154 (e.g., wireless stations (STAs), User Equipments (UEs), mobile wireless communication devices, stationary/fixed location wireless communication devices, etc.), and a cloud network 199. In some examples, the cloud network is implemented within a mobile backhaul communication system within a communication system that provides mobile communication services to the wireless communication devices 151-154. In other examples, the cloud network is implemented within an anchorless mobile backhaul communication system within a communication system that provides mobile communication services to the wireless communication devices 151-154. Note that an anchorless mobile backhaul communication system does not include dedicated components such as a service gateway (SGW) to effectuate communications for the wireless communication devices 151-154. Instead, in an anchorless mobile backhaul communication system, communications may be effectuated without using the general packet radio service (GPRS) tunneling protocol (GTP) as is used in anchor-based communication systems. Such an example of anchorless mobile backhaul communication system may be implemented in various ways including based on a locator/identifier separation protocol (LISP).

For example, an anchorless routing architecture within a communications system that is based on LISP (or similar technologies) establishes a new paradigm in which a communication device identity and its network location are split into two separate name spaces, namely, as End-point Identifiers (EID) and Route locators (RLOC). The EID-RLOC relationship is maintained and correlated via a dynamic mapping mechanism within the mapping cloud 122. Note that the RLOCs are tied to the network topology such as within the cloud network 199. These RLOCs represent various network components (e.g., network hardware, network switches, network routers, etc.) that are reachable via traditional routing within a communication system such as the cloud network 299.

The EIDs represent the communication devices (e.g., mobile end devices, cellular phones, wireless stations (STAs), etc.) that are reachable via different RLOCs based on their current respective network location where they get instantiated or activated. In accordance with a LISP implementation, the mapping cloud 122 based on the LISP implementation stores EID-RLOC mappings. Note that such as mapping cloud may be implemented similar to the distributed cloud DB 190 across multiple devices in the cloud network 199 in some examples, or alternatively implemented in a centralized DB. The mapping cloud 122 maintains a current/up to date EID-RLOC mapping, so that the communication devices having their respective EIDs can easily move between RLOCs while still maintaining effective communication via the overall cloud network 199. In an example, using such an anchorless architecture, various network technologies such as LISP implementation allow the EID name space associated with the respective communication devices to move easily without any impact to the core routing paths and connectivity between the RLOCs.

The wireless communication devices 151-154 may be laptop computers, or tablets, personal digital assistants, personal computers, cellular telephones, smart phones, and/or any other wireless communication devices configured to communicate wirelessly with one or more of the WCAN devices 110-140. Other examples of such wireless communication devices 151-154 could also or alternatively include other types of devices that include wireless communication capability. Details of various embodiments of such WCAN devices are described in greater detail with reference to FIG. 8A and FIG. 8B among other diagrams. Details of various embodiments of such wireless communication devices are described in greater detail with reference to FIG. 9A and FIG. 9B among other diagrams.

The WCAN devices 110-140 are operably coupled to various devices (e.g., network hardware) within the cloud network 199. Examples of such devices (e.g., network hardware) include any one or more of WCAN device, router, switch, bridge, modem, system controller, server, data center (e.g., including containers or virtual machines therein such as in a Cloud Radio Access Network (CRAN)), cloud storage device, route locator (RLOC), etc.

In some implementations, a given WCAN device of the WCAN devices 110-140 has associated one or more components (e.g., one or more of antenna(s), antenna array(s), etc.) through which it can communicate wirelessly with the wireless communication devices in its area or proximity. In some examples, such components are co-located with a given WCAN device (e.g., at the same location, or within close proximity to one another such as within a certain distance such as less than or equal to X meters, where X may be 1, 5, 10, 100, or some other positive number used to specify co-location or close proximity). Note than more than one of such components may be employed in various embodiments and for the given WCAN device. Such implementations of a given WCAN device includes the given WCAN device being implemented as a base station, a distributed base station, an Evolved Node B (eNodeB), a Home Evolved Node B (Home eNodeB), or a next generation Node B (gNodeB), etc.

In other implementations, a given WCAN device of the WCAN devices 110-140 has associated one or more remotely-located components (e.g., one or more of remotely-located antenna(s), remotely-located antenna array(s), transmit/receive (TX/RX) points, remote radio head(s) (RRH(s)), base station(s), distributed base station(s), eNodeB(s), Home eNodeB(s), or gNodeB(s), etc.) to communicate wirelessly with certain of the wireless communication devices. In some examples, such remotely-located components are located remotely with the respective WCAN device (e.g., at a different location, or beyond a close proximity to the respective WCAN device such as at least a certain distance away from the given WCAN device such as more than or equal to Y meters, where Y may be 10, 100, 500, 1 k, or some other positive number used to specify non-co-location or non-close proximity, and where there may be relationship between X above and Y such that within X meters specifies co-location or non-close proximity, and beyond Y meters specifies non-co-location or non-close proximity). The given WCAN device facilitates the communication to/from the certain of the wireless communication devices via its respective one or more remotely-located components. In some examples, the given WCAN device coordinates and manages a set of transmit/receive (TX/RX) points that each respectively support communications for different, respective, and unique cells (e.g., different coverage regions) each having different, respective, and unique cell IDs to support wireless communications in those cells. In addition, in certain implementations, the WCAN device coordinates and manages the set of transmit/receive (TX/RX) points in a manner such that different respective transmit/receive (TX/RX) points use a common cell ID (e.g., in a mobile communication system in which a UE may communicate at the same time or simultaneously with more than one of the transmit/receive (TX/RX) points that share a common cell ID, such may be implemented in accordance with a hypercell configuration in which a UE connects with a logical access node that is composed of multiple eNodeBs, transmit/receive (TX/RX) points, etc.).

Regardless of the specific implementation of the given WCAN device, the given WCAN device is operative to provide communications wirelessly with one or more of the wireless communication devices 151-154 as well as with the cloud network 199. Typically, one of the wireless communication devices 151-154 registers with a particular one of the WCAN devices 110-140 to receive services from the communication system (e.g., Internet access via the Internet 195 such as via a packet data network gateway (PGW), an Internet gateway router (IGR) or other interface and/or means, voice calling communications, media such as audio and/or video communications, data communications, etc.). In addition, when the cloud network 199 is implemented as part an anchorless implementation, a mapping cloud 122 includes the current topology and mapping of the respective adaptive and configurable devices within the cloud network 199. Other examples of mapping clouds are described further with respect to other examples and embodiments herein.

Any of the various wireless communication devices (WDEVs) 151-154 and WCAN devices 110-140 may include a processing circuitry, a communication interface, and/or memory to support communications with any other of the WDEVs 151-154 and WCAN devices 110-140. In an example of operation, a processing circuitry and/or a communication interface implemented within one of the devices (e.g., any one of the WDEVs 151-154 and WCAN devices 110-140) is/are configured to process at least one signal received from and/or to generate at least one signal to be transmitted to another one of the devices (e.g., any other one of the WDEVs 151-154 and WCAN devices 110-140).

A distributed cloud database (DB) 190 is implemented across a number of devices within the cloud network 199. For example, a dispersed storage mechanism may be used to store various information in a distributed manner across a number of devices within the distributed cloud DB 190.

In general, such a distributed cloud DB 190 may be implemented to store any of a variety of types of information. In one example, the distributed cloud DB 190 stores information related to device identifiers (e.g., wireless communication device identifiers) associated with the wireless communication devices 151-154. Examples of such device identifiers may include unique information that is specifically associated with the wireless communication devices (e.g., which may be based on and/or correspond to phone number, device name, username, user/owner's name, user/owner's login information, user/owner's account identifier, and/or other information that identifies the wireless communication devices). In addition, one or more respective values may be associated with and stored with each of the device identifiers. For example, such value(s) may correspond to specific information associated with a particular device and device identifier. As one example with respect to a specific User Equipment (UE) (e.g., a phone number of the UE being the device identifier), the associated value(s) may include specific information related to location of that UE within the communication network (e.g., topological location information specifying a network node, such as a WCAN device, through which the UE can be reached). Such location information may be a specific WCAN device with which the UE is currently associated (e.g., registered, authenticated, etc.).

As another example with respect to specific UE (e.g., a user/owner's account name of the UE being the device identifier), the associated value(s) may include specific information related to the account information associated with that user/owner's account name (e.g., billing information, subscription information, payment information, contact information, etc.). For example, the distributed cloud DB 190 stores policy profile records associated with the wireless communication devices 151-154 (and optionally other wireless communication devices not shown) and communications statistics associated with the wireless communication devices 151-154 (and optionally other wireless communication devices not shown). For example, a policy profile record for a wireless communication device may include information related to an account associated with that wireless communication device such as may be with respect to a user or owner of that wireless communication device. Examples of such information included in the policy profile record may include any one or more of subscription information, data plan information, services available, capacity, trend analysis, cost allocations, auditing, connection, start-stop information related to such communications, metering, accounting, etc. and/or any other information that may be used to enforce policies associated with the policy profile record when supporting communications and/or collect statistics associated with those communications made in accordance with the policy profile record. In general, such information included in the policy profile record associated with a wireless communication device correspond to all policy, policing, metering, statistics collection, and all other information gathering based on communications made by a given wireless communication device. Generally, information included within the distributed cloud DB 190 may be information that is used in accordance with any embodiment of an Authentication, Authorization, and Accounting (AAA) protocol such as may be used within a communication system billing system to enforce, track, and bill communication activities of a given wireless communication device by one or more service providers. In general, any desired type of information may be stored in such a distributed cloud DB 190 as described herein.

In yet another example, the mapping cloud 122 as described above with respect to an anchorless implementation is a DB that is implemented within the distributed cloud DB 190 (e.g., including the EID-RLOC mapping of the cloud network 199 as described above). The current topology and connectivity of the cloud network 199 including the current implementation and connectivity of the various devices in the cloud network 199 may be included in the distributed cloud DB 190 in some examples. For example, the device identifiers may correspond to the specific components within the cloud network 199, and the associated value(s) may correspond to the current configuration/connectivity of those components within the cloud network 199.

In an example of operation and implementation, WCAN device 120 supports communications with wireless communication devices 153, 154. The WCAN device 120 includes various components that, when appropriately configured, operate to effectuate certain operations and functions. Examples of such components within the WCAN device 120 may be found with reference to FIG. 8A and FIG. 8B (e.g., a WCAN device may include radio frequency (RF) circuitry, RF interface (I/F) circuitry, network communication circuitry, memory, and/or processing circuitry).

For example, the WCAN device 120 is configured to communicate with at least one wireless communication device (e.g., one or both of wireless communication devices 153, 154) using RF interface (I/F) circuitry. Note that the RF interface (I/F) circuitry may itself include RF circuitry that is configured to support RF communications with one or more UEs (e.g., over the air) and/or alternatively include interface circuitry configured to communicate via one or more intervening components to an end component/device that includes RF circuitry that is configured to support RF communications with one or more UEs (e.g., over the air). For example, as described above, such a WCAN device 120 may be implemented in a variety of ways. For example, the WCAN device may itself include one or more components (e.g., one or more of antenna(s), antenna array(s), etc.) that are co-located with respect to the WCAN device 120 to effectuate wireless communications directly with one or more UEs and/or may communicate via one or more other components (e.g., one or more of remotely-located antenna(s), remotely-located antenna array(s), transmit/receive (TX/RX) points, remote radio head(s) (RRH(s)), base station(s), distributed base station(s), eNodeB(s), Home eNodeB(s), or gNodeB(s), etc.) that are remotely-located with respect to the WCAN device 120 to effectuate wireless communications indirectly with one or more UEs. In one implementation, such RF interface (I/F) circuitry includes RF circuitry that is configured to support RF communications with one or more UEs (e.g., over the air); in this implementation, the RF interface (I/F) circuitry communicates directly with one or more UEs using RF circuitry implemented therein. In another one implementation, such RF interface (I/F) circuitry communicates with one or more other components that couple to and/or connect to an end component/device that includes RF circuitry that is configured to support RF communications with one or more UEs (e.g., over the air); in this implementation, the RF interface (I/F) circuitry communicates indirectly with the with one or more UEs via the one or more intervening components/devices.

Also, the WCAN device is configured to communicate with the cloud network 199, which may be implemented as an anchorless mobile backhaul communication system in some examples, using network communication circuitry. In some examples, the WCAN device 120 includes processing circuitry that is coupled to the RF interface (I/F) circuitry, the network communication circuitry, and the memory. The processing circuitry of the WCAN device 120, when executing operational instructions stored in the memory, is configured to perform various operations and functions.

Considering a computing device within the communication system (alternatively referred to as a communication network) of this diagram, such a computing device is implemented to include network communication circuitry to communicate via the communication network, memory to store operational instructions, and processing circuitry that, when executing operational instructions stored in the memory, is configured to perform various operations and functions. In an example of operation and implementation, a computing device is configured to store (e.g., in its memory) a subset of key-value pairs corresponding to a subset of device identifiers associated with the communication network (e.g., associated with computing devices of the cloud network 199). Note that the key-value pairs within this computing device and other computing devices within the communication network are distributedly stored across those other computing devices based on a sorted key-order. For example, the subset of the key-value pairs within this computing device includes keys that are greater than keys of a predecessor subset of the key-value pairs stored within a predecessor computing device and that are lower than keys of a successor subset of the key-value pairs stored within a successor computing device. From computing device to computing device, the key-value pairs are stored based on a sorted key-order.

With respect to the manner of sorting of the keys of the key-value pairs, any desired sorting mechanism may be used that sort them in some increasing (or decreasing) order (e.g., monotonically increasing, linearly or piece-wise linearly increasing, in in some linear-type or quasi-linear-type order, etc.). One example of such sorting is based on alpha-numeric sorting (e.g., where a key such as "1userX" would precede another key such as "Charlie", where a key such as "pet_name_0" would precede another key such as "xray9", where a key such as "032" would precede another key such as "121", and so on based on an increasing order). Such examples are provided when comparing two keys. Similar sorting is made with respect comparing more than two keys such that they are arranged in accordance with some increasing (or decreasing) order across the set of keys.

In this example, the computing device is configured to receive (e.g., via the network communication circuitry and from a requesting computing device within the cloud network 199) a query for a requested key-value pair that corresponds to a requested device identifier. The computing device processes the request for the value associated with the received key (e.g., the key specified by, associated with, and/or included within the requested key-value pair). When the key associated with the request is within the range of keys associated with the key-value pairs stored within the computing device, which is some embodiments may be referred to as the received key comparing favorably to a key-value pair of the subset of the key-value pairs in the memory, then the computing device is configured to retrieve the key-value pair from the memory and to transmit the value of that key-value pair via the network communication circuitry to the requesting computing device. Note that, in some examples, the retrieved key-value pair is transmitted, and in other examples, only the key is transmitted.

Alternatively, when the key of the requested key-value pair compares unfavorably to all of the subset of the key-value pairs in the memory (e.g., the key associated with the request is outside the range of keys associated with the key-value pairs stored within the computing device), the computing device is configured to generate another query and transmit (e.g., via the network communication circuitry) that query for the requested key-value pair to a first other computing device or a second other computing device.

For example, when the key of the requested key-value pair is less than or greater than keys of the subset of the key-value pairs in the memory, the computing device generates and transmits another query to another computing device. This other query is based on the prior query for the requested key-value pair that is received by the prior computing device in this process.

For example, when the key of the requested key-value pair is less than keys of the subset of the key-value pairs in the memory, this other query is generated and transmitted to a first other computing device that includes a first other subset of the key-value pairs that are lower than keys of the predecessor subset of the key-value pairs stored within the predecessor computing device. Alternatively, when the key of the requested key-value pair is greater than keys of the subset of the key-value pairs in the memory, this other query is generated and transmitted to a second other computing device that includes a second other subset of the key-value pairs that are greater than keys of the successor subset of the key-value pairs stored within the successor computing device.

Figure 2:
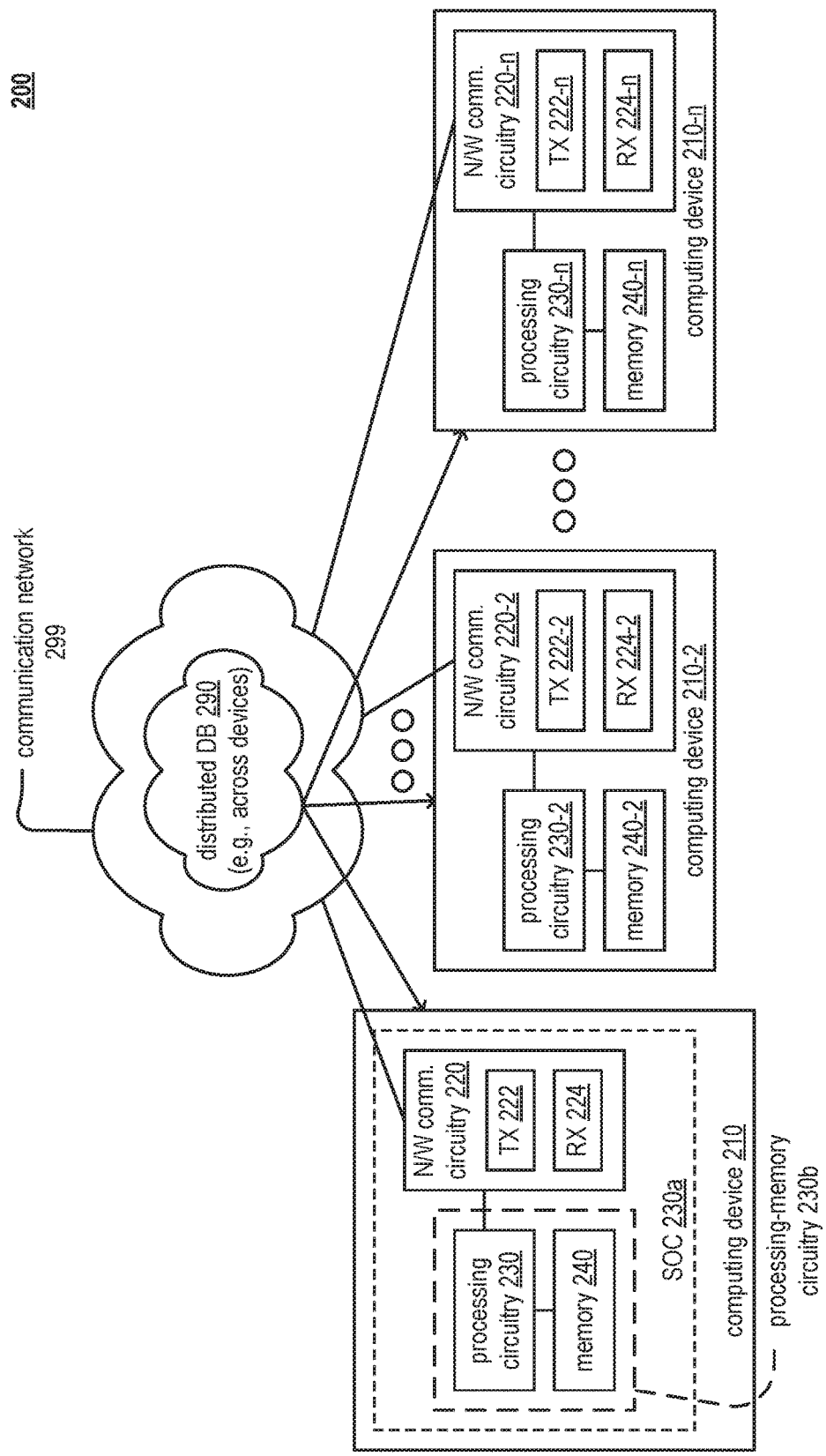
FIG. 2 is a diagram illustrating another embodiment of a communication system.

FIG. 2 is a diagram illustrating another embodiment 200 of a communication system. A computing device 210 is in communication with one or more other computing devices (e.g., computing device 210-2 through computing device 210-n, where is a positive integer) via a communication network 299. Also, a distributed DB 290 is implemented across a number of computing devices within the communication network 299 (e.g., across the computing devices 210 through 210-n). Note that the computing devices 210 through 210-n may include only a subset of computing devices within the overall communication network 299 (e.g., the computing devices 210 through 210-n may correspond to information storing components within communication network 299, yet the communication network may include a variety of other components therein). The computing device 210 includes network communication circuitry 220 to perform transmitting and/or receiving of at least one signal, symbol, packet, frame, etc. (e.g., using a transmitter (TX) 222 and a receiver (RX) 224, which may be separate circuitry, modules, etc. or may be integrated into and part of the network communication circuitry 220) (note that general reference to packet or frame may be used interchangeably).

Generally speaking, the network communication circuitry 220 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 210 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 210 also includes a processing circuitry 230, and an associated memory 240, to execute various operations including interpreting at least one signal, symbol, packet, and/or frame transmitted to computing device 210-2 and/or received from the computing device 210-2 and/or computing device 210-$n$. The computing devices 210 and 210-2 (and/or 210-$n$) may be implemented using at least one integrated circuit in accordance with any desired configuration or combination of components, modules, etc. within at least one integrated circuit.

Also, in some examples, note that one or more of the processing circuitry 230, the network communication circuitry 220 (including the TX 222 and/or RX 224 thereof, which may be separate circuitry, modules, etc. or may be integrated into and part of the network communication circuitry 220), and/or the memory 240 may be implemented in one or more "processing modules," "processing circuits," "processors," and/or "processing units" or their equivalents. Considering one example, one processing circuitry 230$a$ may be implemented to include the processing circuitry 230, the network communication circuitry 220 (including the TX 222 and/or RX 224 thereof), and the memory 240. Considering another example, one processing circuitry 230$b$ may be implemented to include the processing circuitry 230 and the memory 240 yet the network communication circuitry 220 is a separate circuitry.

Considering even another example, two or more processing circuitries may be implemented to include the processing circuitry 230, the network communication circuitry 220 (including the TX 222 and/or RX 224 thereof), and the memory 240. In such examples, such a "processing circuitry" or "processing circuitries" (or "processor" or "processors") is/are configured to perform various operations, functions, communications, etc. as described herein. In general, the various elements, components, etc. shown within the computing device 210 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 210 includes both processing circuitry 230 and network communication circuitry 220 configured to perform various operations. In other examples, the computing device 210 includes processing circuitry 230$a$ configured to perform various operations. In even other examples, the computing device 210 includes processing circuitry 230$b$ configured to perform various operations. Generally, such operations include generating, transmitting, etc. signals intended for one or more other devices (e.g., computing devices 210-2 through 210-$n$) and receiving, processing, etc. other signals received for one or more other devices (e.g., computing devices 210-2 through 210-$n$).

In some examples, note that the network communication circuitry 220 of the computing device 210 is configured to support communications within a wireless communication system and/or a wired communication system. Examples of such communication systems may include a fiber-optic communication system, a hybrid fiber-coaxial (HFC) communication system, a microwave communication system and/or a mobile communication system (and/or any other type of communication system implemented using any type of communication medium or media and configured to serve any types of computing devices). Any of the signals generated and transmitted and/or received and processed by the computing device 210 may be communicated via any of these types of communication systems. For example, the communication network 299 may be implemented as any of a variety of communication networks including any one or more of or combination of a wireless communication system and/or a wired communication system.

Note that computing devices 210-2 through 210-$n$ also include similarly corresponding components as the computing device 210 such as processing circuitry, memory, network communication circuitry, etc. as identified by respective reference numerals with suffix of "-2" through "-$n$" to perform and execute similar operations and functions as the computing device 210.

In an example of operation and implementation, the computing device 210 is configured to store, in the memory 240, a subset of a key-value pairs corresponding to a subset of a device identifiers associated with the communication network 299. For example, the device identifiers may correspond to unique identifiers associated with devices that are associated with the communication network 299. The key-value pairs are distributedly stored across these computing devices 210-2 through 210-$n$ based on a sorted key-order. In general, the key values associated with the key-value pairs are arranged in an increasing (or decreasing) order (e.g., monotonically increasing, linearly or piece-wise linearly increasing, in in some linear-type or quasi-linear-type order, etc.). In comparing the respective subsets of key-value pairs stored among the respective computing devices 210 through 210-$n$, they are grouped such that the subset of the key-value pairs in the computing device 210 includes keys that are greater than keys of a predecessor subset of the key-value pairs stored within a predecessor computing device and that are lower than keys of a successor subset of the key-value pairs stored within a successor computing device. Note that the respective predecessor computing device and successor computing device may be viewed as being before and after the computing device 210, respectively, based on the logical sequential ordering that is based on the sorted key-order of the computing devices 210-2 through 210-$n$.

However, note that the respective computing devices 210-2 through 210-$n$ need not be physically be arranged in any particular order within the communication network 299 in view of this sorted key-order of the computing devices 210-2 through 210-$n$. In general, the respective computing devices 210-2 through 210-$n$ may be located anywhere within and with respect to the communication network 299. With respect to the respective subsets of key-value pairs stored among the respective computing devices 210 through 210-$n$ and the values of the keys stored therein, the logical sequential ordering may be viewed as a manner of sorting the computing devices 210 through 210-$n$ based on the respective subsets of the key-value pairs stored therein irrespective of their actual physical locations.

In this example of operation and implementation, the computing device 210 is configured to receive, via the network communication circuitry 220 and from a requesting computing device (e.g., another device in the communication network 299 not shown), a query for a requested key-value pair that corresponds to a requested device identifier. The computing device 210 processes the query to determine value of the key thereof. When the key of the requested key-value pair compares favorably to a key-value pair of the subset of the key-value pairs in the memory 240 (e.g., the key of the requested key-value pair matches one of the key-value pairs stored in the memory 240), the computing device 210 is configured to retrieve the key-value pair from the memory 240 and transmit the key-value pair via the network communication circuitry 220 to the requesting computing device.

When the key of the requested key-value pair compares unfavorably to all of the subset of the key-value pairs in the memory (e.g., the key of the requested key-value pair fail to match any one of the key-value pairs stored in the memory 240), the computing device is configured to generate another query and transmit, via the network communication circuitry 220, that other query for the requested key-value pair to a first other computing device or a second other computing device (e.g., selected from among the other computing devices 210-2 through 210-n).

For example, the computing device 210 is configured to generate and transmit another query for the requested key-value pair to the first other computing device that includes a first other subset of the key-value pairs that are lower than keys of the predecessor subset of the key-value pairs stored within the predecessor computing device when the key of the requested key-value pair is less than keys of the subset of the key-value pairs in the memory. In certain situations when the key of the requested key-value pair is less than keys of the subset of the key-value pairs in the memory, the computing device 210 is configured to generate and transmit another query for the requested key-value pair to the predecessor computing device.

Alternatively, the computing device 210 is configured to generate and transmit another query for the requested key-value pair to the second other computing device that includes a second other subset of the key-value pairs that are greater than keys of the successor subset of the key-value pairs stored within the successor computing device when the key of the requested key-value pair is greater than keys of the subset of the key-value pairs in the memory. In certain situations when the key of the requested key-value pair is greater than keys of the subset of the key-value pairs in the memory, the computing device 210 is configured to generate and transmit another query for the requested key-value pair to the successor computing device.

Note that the device identifiers associated with the various key-value pairs may be any of a variety of device identifiers. In one example, consider the Internet-based Skype communication platform. The keys of the key-value pairs correspond to unique Skype usernames associated different respective accounts and/or users of the Skype communication platform. The corresponding values of the key-value pairs may be the locations of the devices via which the respective accounts and/or users of the Skype communication platform are located (e.g., the Internet Protocol (IP) addresses of the devices by which they are accessing the Skype communication platform).

In another example, consider a mobile communication system. The keys of the key-value pairs correspond to unique device identifiers of mobile communication devices associated with the mobile communication system. Examples of the unique device identifiers of mobile communication devices may be based on and/or correspond to any one or more of a User Equipment (UE), a username, a phone number, an International Mobile Subscriber Identity (IMSI), an International Mobile Equipment Identity (IMEI), and/or any other identifier that may be used to track the mobile communication devices associated with the mobile communication system. For example, a mobile communication device may include one or more of a Universal Subscriber Identity Module (USIM), a Subscriber Identify Module/Universal Subscriber Identity Module (SIM/USIM), a Subscriber Identify Module (SIM), and/or any other module(s) therein on which such an identifier may be based and used to track that mobile communication devices in accordance with the mobile communication system.

The corresponding values of the key-value pairs may be the locations of the mobile communication devices within the mobile communication system (e.g., an identifier of the respective WCAN devices via which the mobile communication devices associate with the mobile communication system, the communication sub-networks via which the via which the mobile communication devices associate with the mobile communication system, and/or any other indicator of the via which the mobile communication devices associate with the mobile communication system). For example, the values of the key-value pairs may include any one or more of a location associated with key of the key-value pair, an Internet Protocol (IP) address associated with the key of the key-value pair, a port address-IP address pair associated with the key of the key-value pair, a base station (BS) associated with the key of the key-value pair, a wireless local area network (WLAN) associated with the key of the key-value pair, and/or a local area network (LAN) associated with the key of the key-value pair.

In another example, consider a phone book. The keys of the key-value pairs correspond to the unique name and address combinations of respective people listed in the phone book. The corresponding values of the key-value pairs may be the phone numbers of those unique name, unique address, and/or unique phone number combinations of respective people listed in the phone book. For example, the keys may correspond to the unique names of people listed in the phone book, and the values may be the unique addresses and/or unique phone numbers of those people. While the keys may stay constant over time (e.g., people generally keep their same names over time), the values of unique addresses and/or unique phone numbers of those people may change and vary (e.g., people may move, change their number, get a new phone number, etc.).

In general, such a distributed DB 290 may be implemented to store any of a variety of information that may be categorized in accordance with a key-value pair relationship.

Figure 3:
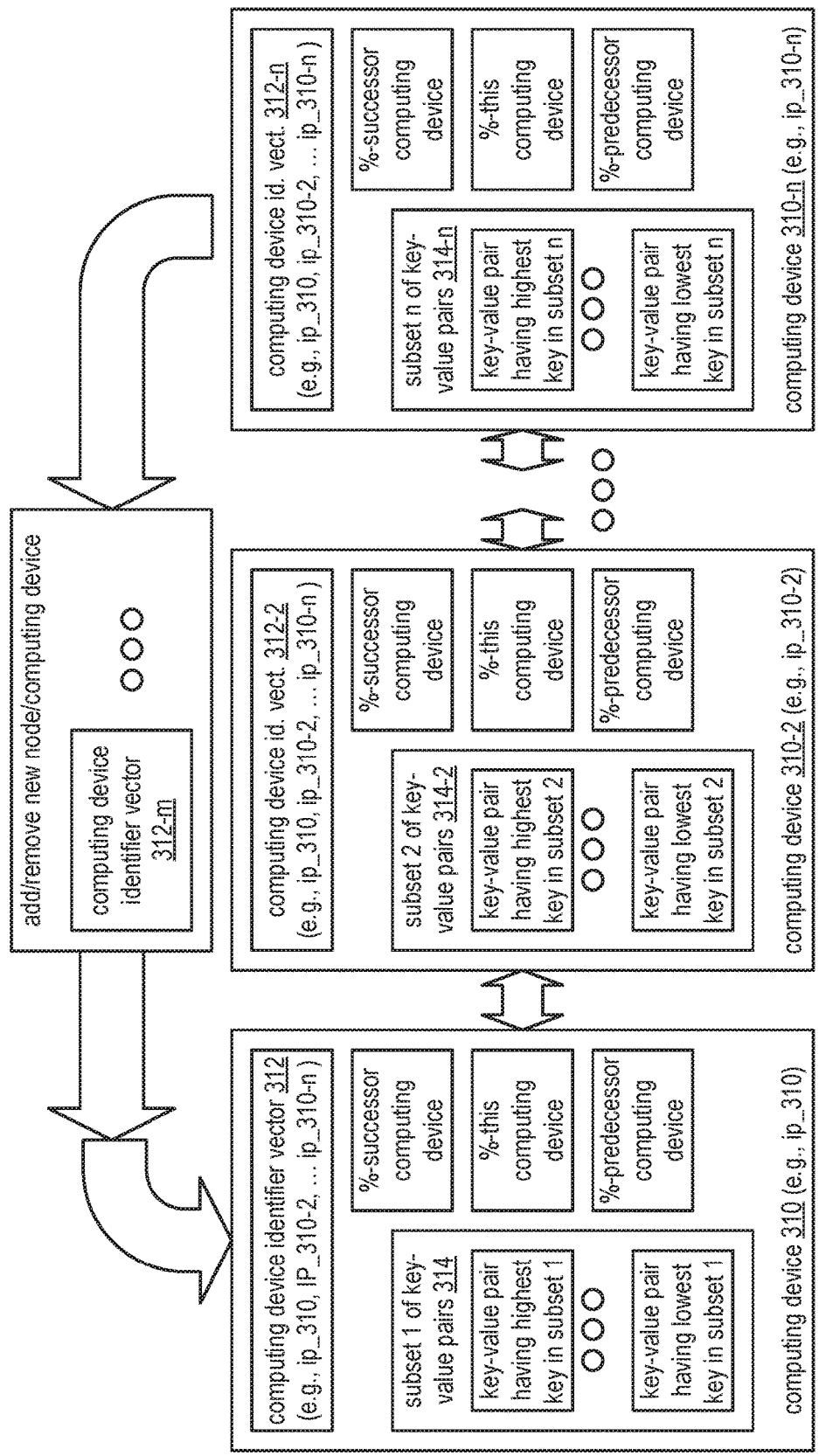
FIG. 3 is a diagram illustrating an embodiment of at least a portion of communication system that includes a distributed database implemented across multiple computing devices.

FIG. 3 is a diagram illustrating an embodiment 300 of at least a portion of communication system that includes a distributed database implemented across multiple computing devices. This diagram shows a set of computing devices 310, 32-2 through 320-n (e.g., nodes) in a communication system (e.g., a cloud network, a distributed storage system, etc.). In some examples, each of the computing devices 310 through 310-n includes a respective unique identifier in the communication system (e.g., a unique Internet Protocol (IP) address within the communication system).

Each computing device stores a respective copy of a computing device vector (e.g., computing device 310 stores a computing device identifier vector 312) that includes such unique identifiers of the computing devices in the communication system that support a distributed DB that includes all of the key-value pairs. In addition, each computing device stores a respective subset of key-value pairs that includes a respective key-value pair having a highest key in its respective subset and a key-value pair having a lowest key in its respective subset (e.g., computing device 310 stores a subset 1 of key-value pairs 314 including a key-value pair having a highest key in subset 1 and a key-value pair having a lowest key in its respective subset 1). As a function of the key values of the key-value pairs stored in the respective computing devices, the computing devices 310 through 310-$n$ may be viewed as being arranged in a sorted key-order that is logical based on the keys of the key-value pairs. Also, such computing devices may be viewed in accordance with sorted key-order as being are linked to each other circularly in a sorted order (with the exception of the computing device that is the closing link of the ring). Within the respective key-value pair structure within a given computing device, that computing device tracks its own local lowest and highest keys among in key-value pair structure therein. Note that the computing devices 310 through 310-$n$ may physically be arranged in any desired configuration in the communication system and need not be arranged in any physically sorted manner.

In an example of operation and implementation, each respective computing device stores its respective set of key-value pairs in a fast local structure (e.g., a AVL tree that is very quickly searchable such as based on the 1962 paper, "An algorithm for the organization of information" by Georgy Adelson-Velsky and Evgenii Landis, a binary search algorithm, a string search algorithm, etc. and/or any other type of local structure that may be searched efficiently, quickly, etc.).

With respect to the key-value pairs within each of the computing devices 310 through 310-$n$, each computing device stores (e.g., in a memory thereof) a subset of a key-value pairs corresponding to a subset of a device identifiers associated with the communication network. Note that these device identifiers can correspond to any desired types of devices (e.g., User Equipments (UEs) such as in a mobile communication system context, wireless stations (STAs) such as in a wireless local area network (WLAN), other computing devices within a local area network (LAN) and/or Wide Area Network (WAN), etc.). These respective subsets of key-value pairs within the computing devices 310 through 310-$n$ are stored based on a sorted key-order. Note that within the respective computing devices of the system, the key-value pairs within any given computing device may be stored in any desired manner and need not be stored within any particular order therein. However, note that the key-value pairs may optionally be stored in a sorted order therein, but they may be stored in accordance with any desired format, ordering, configuration, etc. For example, a computing device tracks which is the key-value pair with the highest local key among the subset of key-value pairs stored therein and the key-value pair with the lowest local key among the subset of key-value pairs stored therein, yet that subset of key-value pairs stored in that computing device can be stored in any desired manner therein. The respective subsets of key-value pairs are stored based on a sorted key-order in accordance with a key-value pair subset-by-subset basis within the computing devices 310 through 310-$n$ in accordance with the logical sequential ordering of those computing devices 310 through 310-$n$.

Note that while many embodiments, examples, etc. described herein describe distribution of the key-value pairs across computing devices of the system based on the keys of those key-value pairs, those key-value pairs may alternatively be distributed based on another basis or one or more other bases. For example, an alternative embodiment includes distribution of the key-value pairs across computing devices of the system based on frequency by which the key-value pairs are sought or accessed. Consider a first key-value pair or a first group of key-value pairs that are requested with a very high frequency, and consider a second key-value pair or a second group of key-value pairs that are requested with a low high frequency. A first computing device that stores the first key-value pair or a first group of key-value pairs that are requested with a very high frequency may degrade in performance more quickly than a second computing device that stores the second key-value pair or a second group of key-value pairs that are requested with a low high frequency. For example, the first computing device that services significantly more memory accesses may degrade, age, suffer deleteriously, etc. more quickly than the second computing device. As such, the key-value pairs may be distrusted across the computing devices so that a more even distribution of accesses to the computing devices based on the key-value pairs stored therein is achieved. The key-value pairs may be distrusted across the computing devices so that the respective computing devices service, on average, service substantially or approximately a same number of memory accesses (e.g., within some desired measure, such as adjacently located computing devices in the sorted key-order being within X % of each, where X may be 1, 2, 5, 10, and/or any other number as may be desired in a particular embodiment).

Also, the subset of the key-value pairs in a given computing device includes keys that are greater than keys of a predecessor subset of the key-value pairs stored within a predecessor computing device and that are lower than keys of a successor subset of the key-value pairs stored within a successor computing device. In this description, note that predecessor computing devices and successor computing devices are referred to based on the logical sequential ordering of the computing devices in the overall system. For example, the computing device 310-2 includes subset 2 of key-value pairs 314-2 that includes keys that are greater than keys of the subset 1 of key-value pairs 314 stored within computing device 310 and that are lower than keys of a successor subset of the key-value pairs stored within a successor computing device (e.g., a subset 3 of key-value pairs 314-3 stored within a computing device 310-3 (not shown)).

In addition, each of the respective computing devices 310 through 310-$n$ tracks information regarding its own storage usage information with respect to the subset of key-value pairs stored therein. Also, each of the respective computing devices 310 through 310-$n$ also communicates information regarding its own storage usage information regarding the subset of key-value pairs stored therein to the predecessor and/or successor computing device in the arrangement of the distributed DB. For example, the computing device 310 stores storage usage information (shown as %-this computing device) and communicates that information to the predecessor and/or successor computing device in the arrangement of the distributed DB. Also, the computing device 310 receives predecessor storage usage information (shown as %-predecessor computing device) and/or successor storage usage information (shown as %-successor computing device) from the predecessor and/or successor computing device in the arrangement of the distributed DB. As such, computing device 310 maintains its own storage usage information (e.g., that indicates how full is its local store), as well as the storage usage information of its predecessor and/or successor computing device in the arrangement of the distributed DB (e.g., %-predecessor computing device and %-successor computing device stores are also communicated between the computing devices to learn of the level of us of its upstream and downstream neighbors to the computing device in the distributed DB). In another embodiment, in addition to (or in place of) the storage usage information, the computing device may track the processor or input/output (I/O) usage information and may share that information with neighboring computing devices (e.g., predecessor computing device and/or successor computing device). note also that a computing device need not necessarily store its own resource usage information, as such information may be readily determined without needing to issue a request to other computing devices.

As also described below, insertion/deletion of the computing devices within the distributed DB may be done by binary search across the identifier vector (e.g., an IP vector of the computing devices 310 through 310-$n$ of the distributed DB). Also, in some examples, the respective computing devices 310 through 310-$n$ of the distributed DB operate cooperatively with respect to their neighboring computing devices to perform balancing operations. Certain examples operate to maintain a substantially or approximately equal number of key-value pairs within the respective subsets stored across the computing devices 310 through 310-$n$ of the distributed DB (e.g., within some desired measure, such as adjacently located computing devices in the sorted key-order being within Y % of each, where Y may be 1, 2, 5, 10, and/or any other number as may be desired in a particular embodiment). With respect to such balancing operations, when adjacently located computing devices in the sorted key-order detect a difference in storage usage information (or other resource utilization values) of the key-value pairs therein being more than a certain amount (e.g., Z % of each, where Z may be 5, 10, 15, 20 and/or any other number as may be desired in a particular embodiment), then those computing devices execute balancing operations to move key-value pairs there between to make the number of key-value pairs stored in each of them substantially or approximately equal in number.

Then, after performing such balancing operations, a computing device involved in such balancing operations is configured to update its respective local storage usage information to generate updated local storage usage information based on an updated subset of the key-value pairs to be stored in that computing device including identification of a lowest key value and a highest key value therein (at least one of which will be different than before the balancing operations are performed). For example, the computing device is configured to transmit (e.g., via the network communication circuitry) its respective updated local storage usage information to its respective predecessor computing device and to its respective successor computing device.

In addition, as also described below, computing devices (e.g., nodes) may be added to the distributed DB by linking into the structure with 0% full and communicating such information to its neighboring computing devices, and then the neighboring computing devices will begin a balancing operation to fill the newly added computing device (e.g., newly added node). These actions may also propagate through the system in that, it may cause these immediately neighboring computing devices (e.g., nodes) to trigger balancing operations with their respective neighboring computing devices (e.g., nodes) as well. For example, the balancing operations may cascade through multiple, respective computing devices (e.g., nodes) based on the logical sequential ordering of the computing devices in the overall system.

For example, a computing device of the distributed DB is configured to transmit (e.g., via its network communication circuitry and to another computing device that is adjacently located to the computing device in a first direction based on the sorted key-order and/or to yet another computing device that is adjacently located to the computing device in a second direction based on the sorted key-order) local storage usage information of the computing device that specifies empty storage capacity of the computing device. Then, this computing device is configured to receive some key-value pairs to generate its respective subset of the key-value pairs from these other adjacently located computing device(s) to be stored in its respective memory.

Also, computing devices (e.g., nodes) can be removed/deleted from the distributed DB. To avoid removing data from the distributed DB, a computing device (e.g., node) that is to be removed can have its %-full set to infinity (or an extremely large number, a largest number, etc.). this will trigger a balancing operation with at least one of its neighboring computing devices (e.g., its predecessor computing device and/or its successor computing device). As data is transferred out of the to-be-removed computing device (e.g., node), the %-full remains at the set value, and the balancing operation will continue. As neighboring computing devices (e.g., nodes) exceed the %-full of their neighbors, a cascade effect occurs, and those to-be-removed computing devices will be emptied of the key-value pairs stored therein. When the t-be-removed computing device (e.g., node) has had its contents transferred to neighboring computing devices (e.g., nodes), and the neighboring computing devices (e.g., nodes) above and below (based on the logical sequential ordering of the computing devices (e.g., nodes)) can be linked to each other in accordance with the logical sequential ordering. For example, a computing device of the distributed DB is configured to transmit (e.g., via its network communication circuitry to another computing device that is adjacently located to the computing device in a first direction based on the sorted key-order in some embodiments is also configured to transmit data to another computing device that is adjacently located to the computing device in a second direction based on the sorted key-order) local storage usage information of the computing device that specifies full local storage usage (e.g., full storage capacity) of the computing device. Then, this computing device is configured to transmit all of the subset of the key-value pairs stored therein to the these adjacently located computing device(s) to be stored in their respective memory and the memory of this computing device is emptied.

In an example of operation and implementation, each respective computing device maintains its own storage usage information (e.g., using some function to specify a degree of storage usage information, such as %-full modulo) to some desired granularity. The computing devices periodically communicate their respective storage usage information (e.g., %-full) with at least one of their neighboring (or adjacent) computing devices (e.g., nodes). Such neighboring computing devices (e.g., nodes) are also referred to herein as the immediate successor and predecessor computing devices. When difference in the respective storage usage information (e.g., %-full between a given computing device and its successor computing device or predecessor computing device, or percentage difference such as key-value pair percentage difference) crosses a threshold, then those computing devices perform a local balancing operation begins until the threshold is closed. Such balancing operation occurs by the computing device with the higher percentage sending key-value pairs to the node with the lower percentage to be stored therein. The set of one or more key-value pairs from the low end of the range in the high percentage node are sent and stored in the node with the low percentage. As a result, the ranges of the key-value pairs stored in these two respective computing devices shifts slightly. Note that some of the key-value pairs stored within the computing devices may be duplicated to briefly to allow for searches in progress when they move among the distributed DB. For example, certain ranges of key-value pairs within adjacently located computing devices within the distributed DB may overlap (e.g., for brief period of time).

With respect to the communicating of information between the computing devices, in an example, the computing device 310-2 is configured to receive (e.g., via its network communication circuitry and from computing device 310 that is adjacently located to the computing device based on the sorted key-order) remote storage usage information of the computing device 310 (e.g., its predecessor storage usage information such as shown as the %-predecessor computing device).

When local storage usage information of the computing device 310-2 compares unfavorably with the remote storage usage information of the computing device 310, the computing device 310-2 is configured to transmit (e.g., via its network communication circuitry) at least one of the subset of the key-value pairs stored in the computing device 310-2 to the computing device 310 to be stored therein and delete the at least one of the subset of the key-value pairs from its memory. Also, when local storage usage information of the computing device 310-2 compares favorably with the remote storage usage information of the computing device 310, the computing device 310-2 is configured to receive (e.g., via the network communication circuitry) at least one other key-value pair of the plurality of key-value pairs stored in the computing device 310 and store the at least one other key-value pair in its memory.

Figure 4:
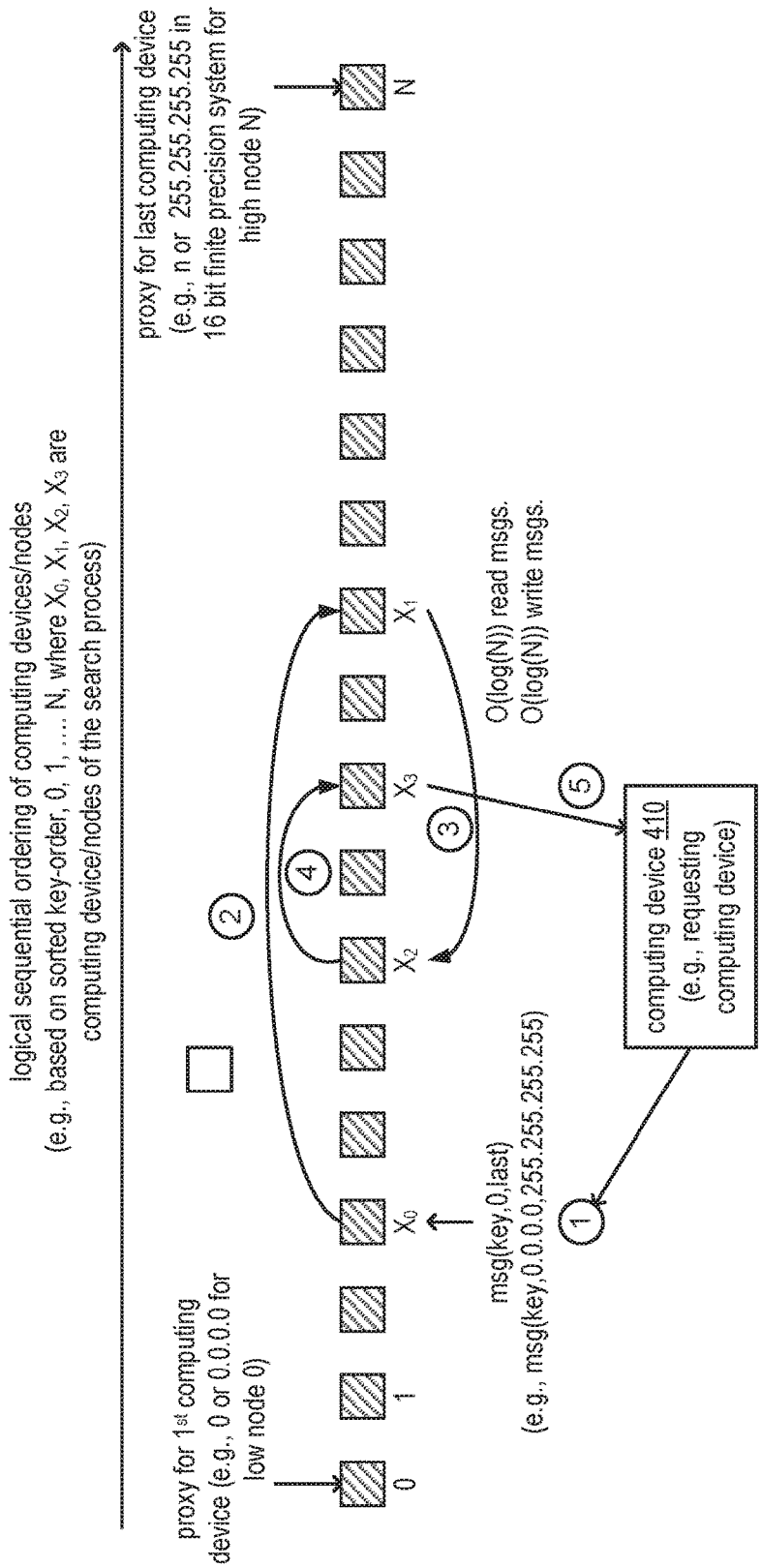
FIG. 4 is a diagram illustrating an example of a search process as applied to a distributed database that is implemented across a number of computing devices.

FIG. 4 is a diagram illustrating an example 400 of a search process as applied to a distributed database that is implemented across a number of computing devices. The hashed blocks in this diagram correspond to computing devices as implemented to store key-value pairs in accordance with a distributed DB such as in communication system. Note that the respective keys of the key-value pairs may be stored also in a reversed order to allow for both prefix and suffix type searches. For example, a key "this_key" may also be stored as "yek_sith" to allow for prefix searches such as "thi*" and suffix searches such as "*ey" (e.g., which, when reversed, would be "ye*" as applied to the reversed ordered keys).

Each respective one of the computing devices has a unique identifier (e.g., an IP address). Also, each respective computing device stores a respective subset of key-value pairs. Consider a search is made within the distributed DB for a specific key-value pair, then a message is sent (e.g., from a requesting computing device) to any given computing device (e.g., node) in the distributed DB (e.g., a first computing device in the search process, an original computing device in the search process). Such a message may include a key that is being searched for accompanied with the identifiers of the lowest computing device and the highest computing device in the distributed DB based on the sorted-key order. For example, a computing device identifier vector will include such information of the lowest computing device and the highest computing device in the distributed DB based on the sorted-key order. For example, a lowest computing device may have an identifier of 0 or an IP address of 0.0.0.0, and a highest computing device may have an identifier of n (e.g., a largest identifier in the distributed DB) or IP address of 255.255.255.255 such as in a 16-bit finite precision system.

If the key included in the request (e.g., being searched for) matches a key-value pair stored within that computing device, then that computing device can return the key-value pair requesting computing device.

Alternatively, if the key included in the request (e.g., being searched for) fails to match any key-value pair stored within that computing device, then that computing device generates and transmits another message to another computing device within the distributed DB. In one situation, when the key included in the request is greater than a highest key of the key-value pairs stored in this computing device, then this computing device generates and transmits another request to a successor computing device in the distributed DB. In a specific example, this computing device generates and transmits another request to a successor computing device in the distributed DB that is located half-way between this computing device and the highest computing device in the distributed DB.

In another situation, when the key included in the request is lower than a lowest key of the key-value pairs stored in this computing device, then this computing device generates and transmits another request to a predecessor computing device in the distributed DB. In a specific example, this computing device generates and transmits another request to a predecessor computing device in the distributed DB that is located half-way between this computing device and the lowest computing device in the distributed DB. In some examples, note that the message may be modified to include additional information or an entirely new message may be generated and transmitted such that the message includes the identifier of this specific computing device (e.g., Self.Node.IP as used in the example below) as well as information related to the highest or lowest computing device that has been part of this search process so far (e.g., highest-node-so-far or lowest-node-so-far as used in the example below).

In some examples, the predecessor computing device is located approximately one-half of the first number of computing devices away from the computing device within the logical sequential ordering, and the successor computing device is located approximately one-half of the second number of computing devices away from the computing device within the logical sequential ordering.

A recipient computing device of a message from a prior, transmitting computing device (e.g., message being a forwarded message, a modified forwarded message, or a subsequently generated and different message, or alternatively a forwarded request, a modified forwarded request, or a subsequently generated and different request) performs similar operations as the first computing device (e.g., a first computing device in the search process, an original computing device in the search process) that receives the request. For example, consider that a successor, second computing device has received a message that includes the key being sought after (e.g., successor, second computing device relative to the first computing device), then when that key matches a key-value pair stored within this second computing device in the search process, then this second computing device can return the key-value pair requesting computing device.

Alternatively, if the key included in the message and/or request from a prior, transmitting computing device fails to match any key-value pair stored within this successor, second computing device, then this successor, second computing device generates and transmits another message to another computing device within the distributed DB. In one situation, when the key included in the request is greater than a highest key of the key-value pairs stored in this successor, second computing device, then this successor, second computing device generates and transmits another request to a successor computing device in the distributed DB. In a specific example, this successor, second computing device generates and transmits another request to a successor computing device in the distributed DB that is located half-way between this successor, second computing device and the highest computing device in the distributed DB.

In another situation, when the key included in this subsequent request is lower than a lowest key of the key-value pairs stored in this successor, second computing device, then this successor, second computing device generates and transmits another request to a predecessor computing device in the distributed DB. In a specific example, this successor, second computing device generates and transmits another request to a predecessor computing device in the distributed DB that is located half-way between this successor, second computing device and the first computing device (e.g., a first computing device in the search process, an original computing device in the search process) in the distributed DB.

This search process continues until the computing device that stores a key-value pair that includes the key specified in the request. As can be seen, in one example, one-half of the distance or measure of computing devices based on the sorted key-order is the basis by which the next computing device is identified and to which this subsequent request is transmitted (e.g., x/2, where x is the number of computing devices between the current computing device in the search process and the lowest computing device, the highest computing device or a previous computing device so-far). However, in general, note than any measure may be used (e.g., x*z/y, where x is the number of computing devices between the current computing device in the search process and the lowest computing device, the highest computing device or a previous computing device so-far and z and y are positive integers, and with y being greater than z). Note also that certain examples may alternatively use different measures with respect to different search processes and/or adapt/modify the measure(s) used during a given search process.

In some examples, this successor, second computing device is configured to receive such a message from a prior, transmitting computing device (e.g., message being a forwarded message, a modified forwarded message, or a subsequently generated and different message, or alternatively a forwarded request, a modified forwarded request, or a subsequently generated and different request) for a requested key-value pair that corresponds to the requested device identifier. When the key of the requested key-value pair compares favorably to another key-value pair of the subset of the key-value pairs in the memory of this successor, second computing device, it is configured to retrieve the requested key-value pair from the memory and transmit the requested key-value pair via the network communication circuitry to the another requesting computing device.

Alternatively, when the key of the requested key-value pair compares unfavorably to all of the subset of the key-value pairs in the memory, this successor, second computing device is configured to generate and transmit another query for the requested key-value pair to yet another computing device that includes yet another subset of the key-value pairs that are greater than keys of the subset of the key-value pairs stored in this successor, second computing device when the key of the requested key-value pair is less than keys of the subset of the key-value pairs in the memory.

Alternatively, when the key of the requested key-value pair compares unfavorably to all of the subset of the key-value pairs in the memory, this successor, second computing device is configured to generate and transmit another query for the requested key-value pair to a yet another computing device that includes yet another other subset of the key-value pairs that are less than keys of the second other subset of the key-value pairs stored in this successor, second computing device when the another key of the another requested key-value pair is greater than keys of the subset of the key-value pairs in the memory.

A specific implementation of such a search process may be implemented based on processing of messages generated by and transmitted between computing devices as follows:

```
Query Node( msg=(key, lowest-node-so-far, highest-node-so-far) )
    if key should be in its self.DB check and respond to original query
locally
    if key < self.DB.lowestKey( )
        next-node = lookup ip of node ½ way to lowest-node-so-far //
(0.0.0.0 == first node)
        send query to next-node msg = (key, lowest-node-so-far,
Self.NodeIP)
    else // > than my highest key
        next- node lookup ip of node ½ way to highest-node-so-far
(255.255.255.255 == last node)
        send query to next-node msg = (key, Self.NodeIP,
highest-node-so-far);
```

Consider a specific example where there may be 5 million key-value pairs stored on each of the respective computing device, then considering a distributed DB composed of 1000 computing devices, then there would be 5 billion key-value pairs to be searched. The search process in accordance with this diagram identifies the appropriate computing device based on no more than 10 messages being transmitted among the 1000 computing devices (e.g., $\log2(1000)=10$ messages). In general, even with a massively distributed DB (e.g., including billions or more of entries of key-value pairs), a search process can be effectuated with a $\log(N)$ number of read/write operations.

An operational example is provided with respect to this diagram based on a 5-step search process. In general, note that more or fewer steps may be performed in alternative search processes. Consider that the distributed DB included computing devices/nodes 0 through N, and consider that computing device 410 (e.g., a requesting computing device, an originator in the search process, etc.) transmits a query to the computing device/node $X_0$ in the distributed DB. Note that such a computing device/node may be any particular computing device/node in the distributed DB. In this example, the computing device/node $X_0$ is shown as being located more closely to the low computing device/node 0 than to the high computing device/node N in the logical sequence ordering of computing device/nodes of the distributed DB.

In an example of operation and implementation, computing device 410 transmits a first query to the computing device/node $X_0$, and when the computing device/node $X_0$ does not store the key-value pair the key specified by the query and the key of that query is greater than the keys of the key-value pairs stored in the computing device/node $X_0$, then the computing device/node Xo generates a second query that also specifies the key of the first query and transmits it to another computing device, computing device/node $X_1$, that is located approximately half-way between computing device/node $X_0$ and the high computing device/node N.

Then, when the computing device/node $X_1$ does not store the key-value pair the key specified by this second query received from computing device/node $X_0$ and the key of interest (e.g., the specified key in the first query, and also in the second query) is less than the keys of the key-value pairs stored in the computing device/node $X_1$, then the computing device/node $X_1$ generates a third query that also specifies the key of the first query and transmits it to another computing device, computing device/node $X_2$, that is located approximately half-way between computing device/node $X_1$ and the prior computing device/node $X_0$ of the search process (e.g., computing device/node $X_0$ being the lowest computing device/node in the search process so far).

Then, when the computing device/node $X_2$ does not store the key-value pair the key specified by this third query received from computing device/node Xi and the key of interest (e.g., the specified key in the first query, and also in the second and third queries) is greater than the keys of the key-value pairs stored in the computing device/node $X_2$, then the computing device/node $X_2$ generates a fourth query that also specifies the key of the first query and transmits it to another computing device, computing device/node $X_3$, that is located approximately half-way between computing device/node $X_2$ and prior computing device/node Xi of the search process (e.g., computing device/node Xi being the highest computing device/node in the search process so far).

Then, when the computing device/node $X_3$ does store the key-value pair the key specified by this fourth query received from computing device/node $X_2$ and the key of interest (e.g., the specified key in the first query, and also in the second, third, and fourth queries), then the computing device/node $X_3$ retrieves the key-value pair from the memory thereof and transmits the key-value pair to the computing device 410. Such a process may also be described based on various steps as follows:

1. query sent to node $X_0$ (e.g., from computing device 410, a requesting computing device)
2. when key is not in $X_0$ (and key >highest at $X_0$), another query sent from $X_0$ to $X_1$ located approx. half-way between $X_0$ and N
3. when key is not in $X_1$ (and key <highest at $X_1$), another query sent from $X_1$ to $X_2$ located approx. half-way between $X_1$ and $X_0$ (lowest computing device/node so far in search process)
4. when key is not in $X_2$ (and key >highest at $X_2$), another query sent from $X_2$ to $X_3$ located approx. half-way between $X_2$ and $X_1$ (highest computing device/node so far in search process)
5. when key is in $X_3$, then $X_3$ provides response Note that this operational example operates based on limiting the bounds of the search process across the distributed DB by one-half at each step. The search process operates to transmit a successive query to a next computing device/node that is located half-way between the current computing device/node and the low computing device/node (or high computing device/node) in the distributed DB or half-way between the current computing device/node and a prior computing device/node that was part of the search process.

Again, note that while certain examples may operates using such a one-half-half-way step process as described above with respect to this operational example, note that different respective measures may be used in other examples.

Figure 5:
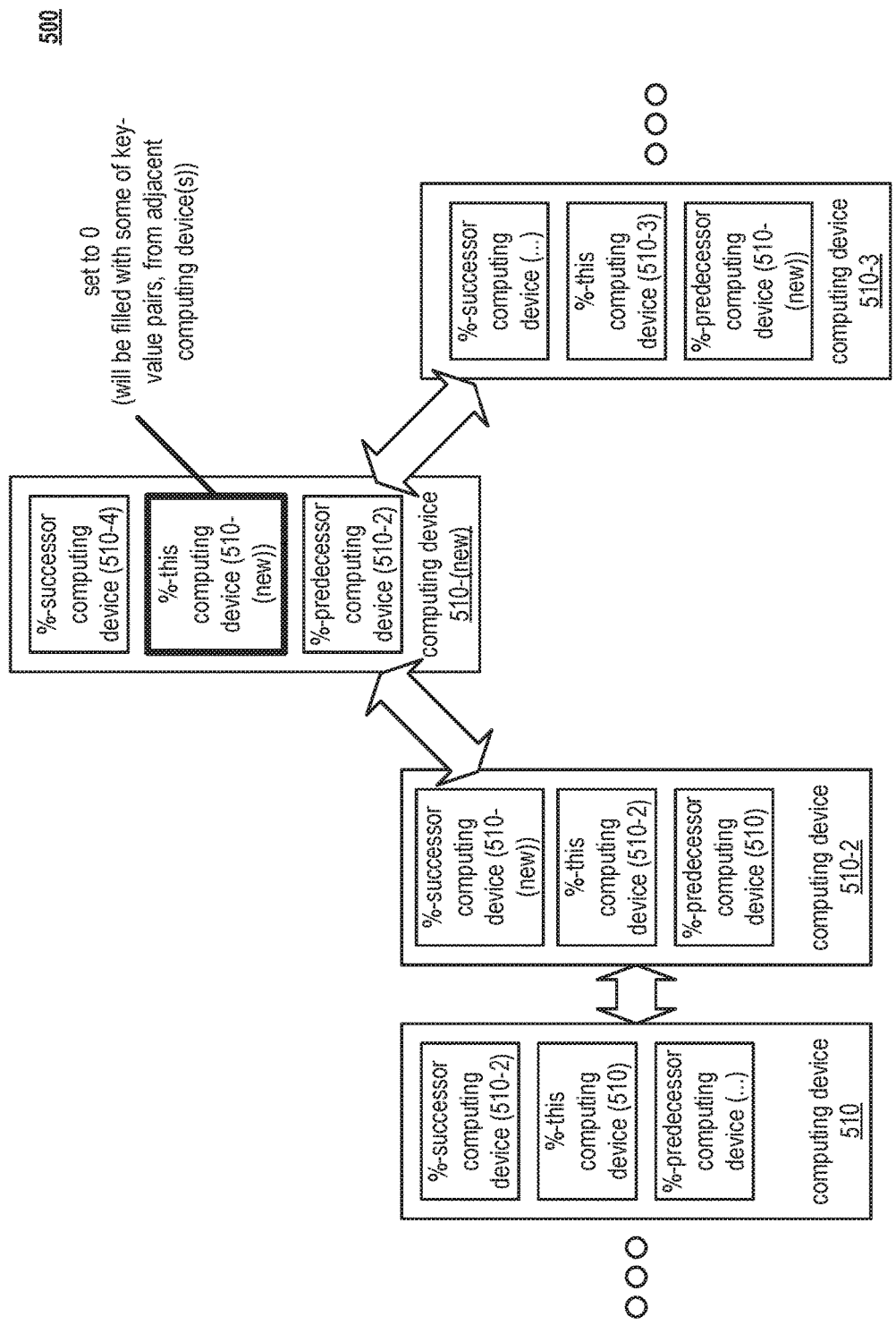
FIG. 5 is a diagram illustrating another embodiment of at least a portion of communication system that includes a distributed database implemented across multiple computing devices including addition of a computing device thereto.

FIG. 5 is a diagram illustrating another embodiment 500 of at least a portion of communication system that includes a distributed database implemented across multiple computing devices including addition of a computing device thereto. Consider a distributed DB that includes at least computing devices 510, 510-2, and 510-3. Each of the respective computing devices stores information regarding the storage usage information of that computing device, and storage usage information of the predecessor and/or successor computing device(s). For example, computing device 510 stores its own storage usage information (%-this computing device (510)), storage usage information of the predecessor computing device (%-predecessor computing device ( . . . )) and/or successor computing device (%-successor computing device (510-2)). The other computing devices 510-2, and 510-3 store similar information relative to their location in the distributed DB.

In this example, a new computing device computing device 510-(new) is to be added to the distributed DB between computing device 510-2 and computing device 510-3. For example, when an operator of the distributed DB determines a need for additional capacity, a new computing device (e.g., node) is allocated and can be inserted into the ring of the distributed DB at any point.

When the new computing device is inserted, its storage usage information (%-full is 0), and its local DB (e.g., memory) is empty (e.g., specifies empty storage usage information such as empty storage capacity of the new computing device). The balancing operations will operate to cause entries to spill down into this new computing device from its predecessor and/or successor computing device and so on recursively across the entire set of nodes such that over time all nodes will have a balanced % full within an acceptable degree or measure.

Figure 6:
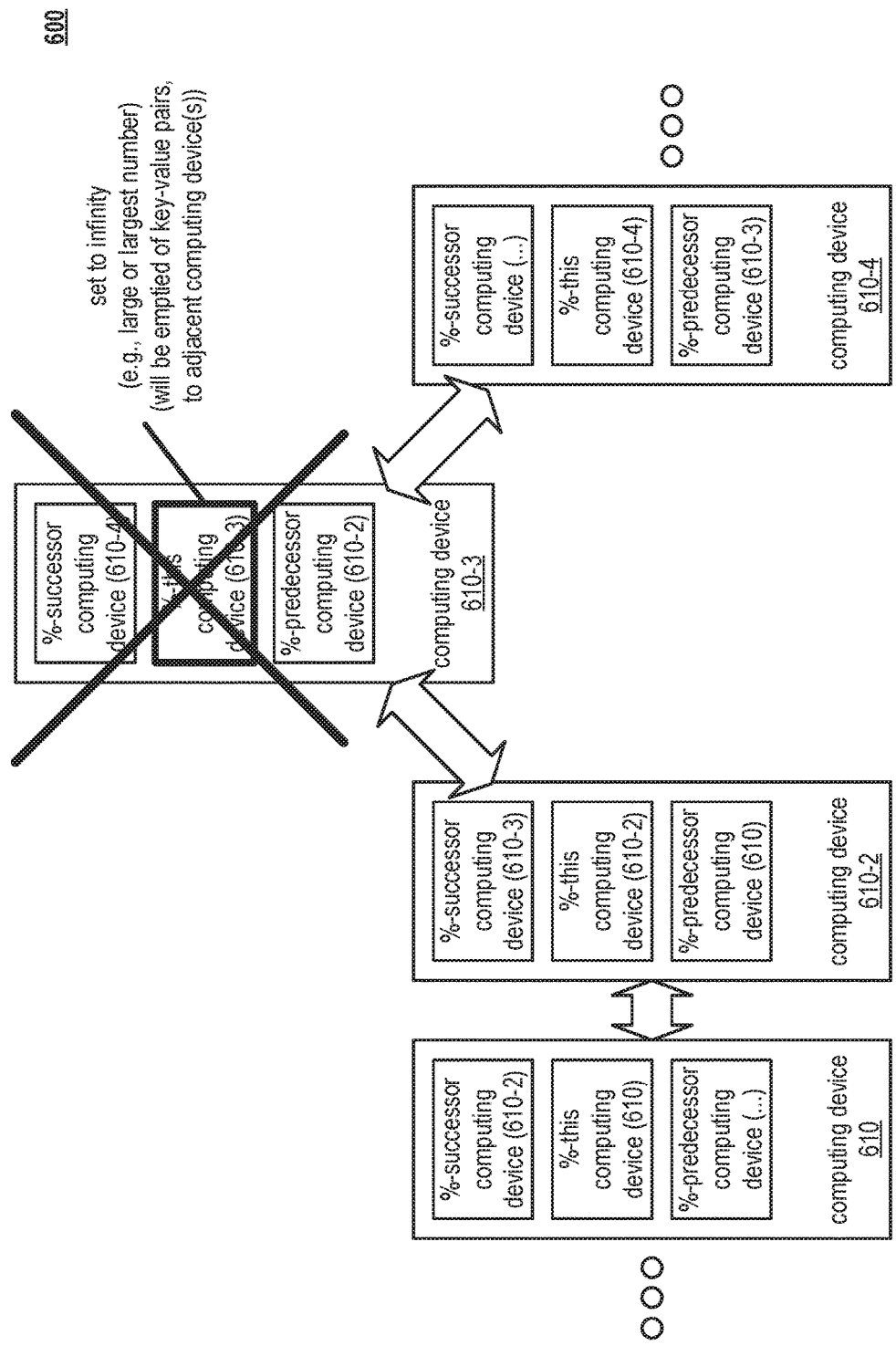

FIG. 6 is a diagram illustrating another embodiment 600 of at least a portion of communication system that includes a distributed database implemented across multiple computing devices including removal of a computing device there from. Consider a distributed DB that includes at least computing devices 610, 610-2, 610-3, and 610-4 and computing device 610-3 is to be removed from the distributed DB. Each of the respective computing devices stores information regarding the storage usage information of that computing device, and storage usage information of the predecessor and/or successor computing device(s). For example, computing device 610 stores its own storage usage information (%-this computing device (610)), storage usage information of the predecessor computing device (%-predecessor computing device ( . . . )) and/or successor computing device (%-successor computing device (610-2)). The other computing devices 610-2, and 610-3 store similar information relative to their location in the distributed DB.

In this example, the computing device 610-3 is to be removed from the distributed DB between computing device 610-2 and computing device 610-4. For example, when operator determines a need to reduce capacity, a given computing device is selected and its respective storage usage information (e.g., %-full) is set to infinity or a very large or largest number possible. The balancing operations will operate to cause entries to spill down from this computing device 610-3 to its predecessor computing device (computing device 610-2) and successor computing device (computing device 610-4) and so on recursively across the entire set of nodes such that over time all nodes will have a balanced % full within an acceptable degree or measure, but this computing device 610-3 will move towards zero storage usage information (e.g., 0%-full). When the operator of the distributed DB sees that the node has reached 0%-full, then it is removed and its predecessor and successor links are updated accordingly (e.g., based on the computing device identifier vector). For example, the IP address of computing device 610-4 is removed from the computing device identifier vector by the ring.

FIG. 7A is a diagram illustrating an example 701 of balancing operations as performed among computing devices within a distributed database implemented across multiple computing devices. Consider a distributed DB that includes at least computing devices 710, 710-2, and 710-3. At or during a first time (T1), computing device 710-3 stores more key-value pairs than computing device 710-2, and computing device 710-2 stores more key-value pairs than computing device 710. As the balancing operations proceed, key-value pairs will be moved from computing device 710-3 to computing device 710-2 and also from computing device 710-2 to computing device 710 (as shown with respect to at or during a second time (T2)). Eventually, the key-value pairs stored across the computing devices 710, 710-2, and 710-3 will be will have a balanced % full within an acceptable degree or measure (at or during a third time (T3)).

FIG. 7B is a diagram illustrating another example 702 of balancing operations as performed among computing devices within a distributed database implemented across multiple computing devices. As with respect to the prior diagram, consider a distributed DB that includes at least computing devices 710, 710-2, and 710-3. At or during a first time (T1), computing device 710 stores more key-value pairs than computing device 710-3, and computing device 710-3 stores more key-value pairs than computing device 710-2. As the balancing operations proceed, key-value pairs will be moved from computing device 710 to computing device 710-2 and also from computing device 710-3 to computing device 710-2 (as shown with respect to at or during a second time (T2)). Eventually, the key-value pairs stored across the computing devices 710, 710-2, and 710-3 will be will have a balanced % full within an acceptable degree or measure (at or during a third time (T3)).

FIG. 8A is a diagram illustrating an embodiment 801 of a WCAN device. A high-level description of a WCAN device that may be operative and/or implemented within various embodiments of a communication system as described above is illustrated. The WCAN device generally includes a control system 860, a baseband processor 850, memory 852, transmit (TX) circuitry 856, receive (RX) circuitry 854, multiple antennas 814, and one or more communication interfaces that can include a network interface 858, or subsets and variations thereof. The memory 852 may be any type of memory capable of storing software and/or data. The receive (RX) circuitry 854 is configured to receive radio frequency signals bearing information from one or more remote UE's (e.g., such as described with reference to FIG. 9A and/or FIG. 9B). In some examples, a low noise amplifier and a filter (not shown) cooperate to amplify and remove broadband interference from the signal for processing. down-conversion and digitization circuitry (not shown) will then down convert the filtered, received signal to an intermediate or baseband frequency signal, which is then digitized into one or more digital streams.

The baseband processor 850 is configured to process the digitized received signal to extract the information or data bits conveyed in the received signal. In some examples, this processing typically comprises demodulation, decoding, and error correction operations. In certain implementations, the baseband processor 850 is implemented in one or more digital signal processors (DSPs), application specific integrated circuits (ASICs), and/or both. The received information is then sent to an associated network via the network interface 858 or transmitted to another User Equipment (UE), mobile terminal, etc. serviced by the WCAN device.

On the transmit side, the baseband processor 850 receives digitized data, which may represent voice, data, control information, and/or other information, from the network interface 858 under the control of the control system 860, and encodes the data for transmission. The encoded data is output to the transmit (TX) circuitry 856, where it is modulated by a carrier signal having a desired transmit frequency or frequencies.

The baseband processor 850 may be configured to perform encoding of one or more bits to generate one or more coded bits used to generate the modulation data (or generally, data). For example, the baseband processor 850 may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

A power amplifier (not shown) will amplify the modulated carrier signal to a level appropriate for transmission, and deliver the modulated carrier signal to the antennas 814 through a matching network (not shown). In one embodiment of the present disclosure, the WCAN device transmits signals using both antennas 814, but receives signals using a single antenna 814. In general, any desired configuration or mode of the operation of the one or more antennas 814 may be used to effectuate transmitting and receiving of signals (e.g., single-input-single-output (SISO) communication, single-input-multiple-output (SIMO), multiple-input-single-output (MISO), and/or multiple-input-multiple-output (MIMO)).

Note that other such transmit/receive circuitry as described with respect to this WCAN device may be implemented for optical, digital subscriber line (DSL), or any other communication scheme. For example, when collocated with a transmit/receive point, a central access unit such as a WCAN device could reuse the baseband processor and other components of the transmit/receive point as necessary (e.g. interfaces for communicating with other transmit/receive points).

FIG. 8B is a diagram illustrating another embodiment 802 of a WCAN device 810. The WCAN device 810 includes a communication interface 820 to perform transmitting and/or receiving of at least one signal, symbol, packet, frame, etc. (note that general reference to packet or frame may be used interchangeably). In some examples, the communication interface 820 is implemented to include radio frequency (RF) interface (I/F) circuitry 826 (e.g., using a transmitter (TX) 827 and a receiver (RX) 828, which may be separate circuitry, modules, etc. or may be integrated into and part of the RF interface (I/F) circuitry 826) and network communication circuitry 822 (e.g., using a transmitter (TX) 823 and a receiver (RX) 824, which may be separate circuitry, modules, etc. or may be integrated into and part of the network communication circuitry 822)).

The RF interface (I/F) circuitry 826 is configured to support wireless communication with one or more UEs (e.g., via one or more antennas, remote radio heads (RRHs), transmit/receive (TX/RX) points, etc. and/or one or more base stations (BSs), Evolved Nodes B (eNodeBs), etc.). The network communication circuitry is configured to support communications (e.g., wirelessly, wire line based, optically, etc.) with a cloud network 899 (e.g., such as a mobile backhaul communication system that may be implemented as an anchorless mobile backhaul communication system including with respect to other examples and embodiments herein).

Generally speaking, the communication interface 820 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the WCAN device 810 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the WCAN device 810 also includes a processing circuitry 830, and an associated memory 840, to execute various operations including interpreting at least one signal, symbol, packet, and/or frame transmitted to wireless communication device 890 (e.g., a UE) and/or wireless communication device 891 (e.g., another UE) and/or received from the wireless communication device 890 and/or wireless communication device 891 (e.g., UEs). The WCAN device 810 and wireless communication device 890 (and/or 891) may be implemented using at least one integrated circuit in accordance with any desired configuration or combination of components, modules, etc. within at least one integrated circuit. Also, the WCAN device 810 and wireless communication device 890 (and/or 891) may each include one or more antennas for transmitting and/or receiving of at least one packet and/or frame (e.g., wireless communication device 890 may include m antennas, and wireless communication device 891 may include n antennas, where m and n are positive integers and may be the same positive integer or different positive integers).

Also, in some examples, note that one or more of the processing circuitry 830, the communication interface 820 (including the respective TX(s) and/or RX(s) thereof), and/or the memory 840 may be implemented in one or more "processing modules," "processing circuits," "processors," and/or "processing units" or their equivalents. Considering one example, a system-on-a-chip (SOC) 830a may be implemented to include functionality as performed by the processing circuitry 830, the communication interface 820 (including the respective TX(s) and/or RX(s) thereof), and the memory 840 (e.g., SOC 330a being a multifunctional, multi-module integrated circuit that includes multiple components therein). Considering another example, processing-memory circuitry 830b may be implemented to include functionality as performed by the processing circuitry 830 and the memory 840 yet the communication interface 820 is a separate circuitry (e.g., processing-memory circuitry 830b is a single integrated circuit that performs functionality of a processing circuitry and a memory and is coupled to and also interacts with the communication interface 820).

Considering even another example, two or more processing circuitries may be implemented to include the processing circuitry 830, the communication interface 820 (including the respective TX(s) and/or RX(s) thereof), and the memory 840. In such examples, such a "processing circuitry" or "processing circuitries" (or "processor" or "processors") is/are configured to perform various operations, functions, communications, etc. as described herein. In general, the various elements, components, etc. shown within the device 810 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the WCAN device 810 includes both processing circuitry 830 and communication interface 820 configured to perform various operations. In other examples, the WCAN device 810 includes SOC 830a configured to perform various operations. In even other examples, the WCAN device 810 includes processing-memory circuitry 830b configured to perform various operations. Generally, such operations include generating, transmitting, etc. signals intended for one or more other devices (e.g., wireless communication devices 890 through 891) and receiving, processing, etc. other signals received for one or more other devices (e.g., wireless communication devices 890 through 891).

In some examples, note that the communication interface 820, which is coupled to the processing circuitry 830, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 810 may be communicated via any of these types of communication systems.

Figure 9A:
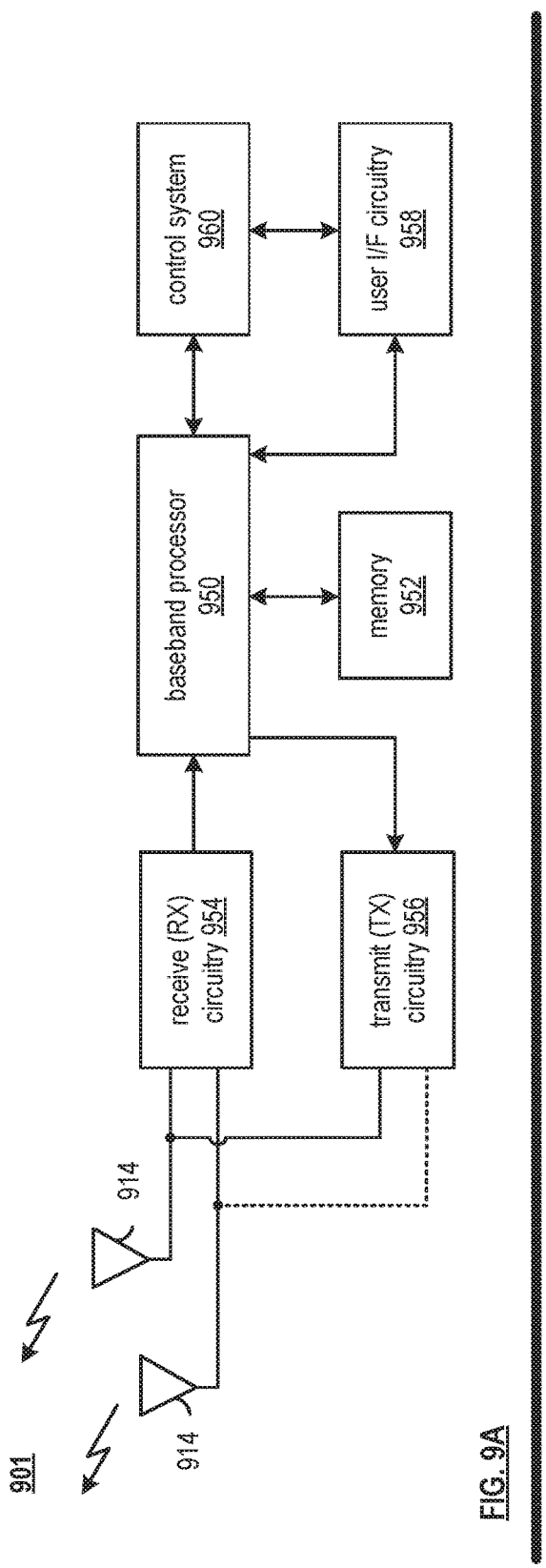
FIG. 9A is a diagram illustrating an embodiment of a wireless communication device (e.g., a User Equipment (UE)).

FIG. 9A is a diagram illustrating an embodiment 901 of a wireless communication device (e.g., a User Equipment (UE)). A high-level description of the components of a UE shown. Similarly, to the transmit/receive point 1102, the UE 1202 will include a control system 960, a baseband processor 950, memory 952, transmit (TX) circuitry 956, receive (RX) circuitry 954, multiple antennas 914, and user interface circuitry 958, or subsets and variations thereof. The receive circuitry 1224 receives radio frequency signals bearing information from one or more WCAN devices. In some examples, a low noise amplifier and a filter (not shown) cooperate to amplify and remove broadband interference from the signal for processing. Down conversion and digitization circuitry (not shown) will then down convert the filtered, received signal to an intermediate or baseband frequency signal, which is then digitized into one or more digital streams.

The baseband processor 950 processes the digitized received signal to extract the information or data bits conveyed in the received signal. In some examples, this processing typically comprises demodulation, decoding, and error correction operations. In certain implementations, the baseband processor 950 is implemented in one or more digital signal processors (DSPs), application specific integrated circuits (ASICs), and/or both.

For transmission, the baseband processor 950 receives digitized data, which may represent voice, data, control information, and/or other information, from the control system 960 and/or the user interface circuitry 958, which it encodes for transmission. The encoded data is output to the transmit circuitry 956, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 914 through a matching network (not shown). The UE may receive signals using both antennas 914, but transmits signals using a single antenna 914.

In orthogonal frequency division multiplexing (OFDM) modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Single Carrier FDMA (SC-FDMA) modulation differs from OFDM modulation in that SC-FDMA uses a DFT block before mapping symbols to sub-carriers and that it uses a parallel-to-serial unit after the IFDT block. Otherwise SC-FDMA modulation is otherwise similar to OFDM modulation.

OFDM is used for at least the downlink transmission from WCAN devices to UEs. For example, each WCAN device may be equipped with n transmit antennas 814, and each UE is equipped with m receive antennas 914. Notably, the respective antennas can be used for reception and transmission using appropriate duplexers or switches and are so labeled only for clarity. Also, in general, any desired configuration or mode of the operation of the one or more antennas 914 may be used to effectuate transmitting and receiving of signals (e.g., single-input-single-output (SISO) communication, single-input-multiple-output (SIMO), multiple-input-single-output (MISO), and/or multiple-input-multiple-output (MIMO)).

Figure 9B:
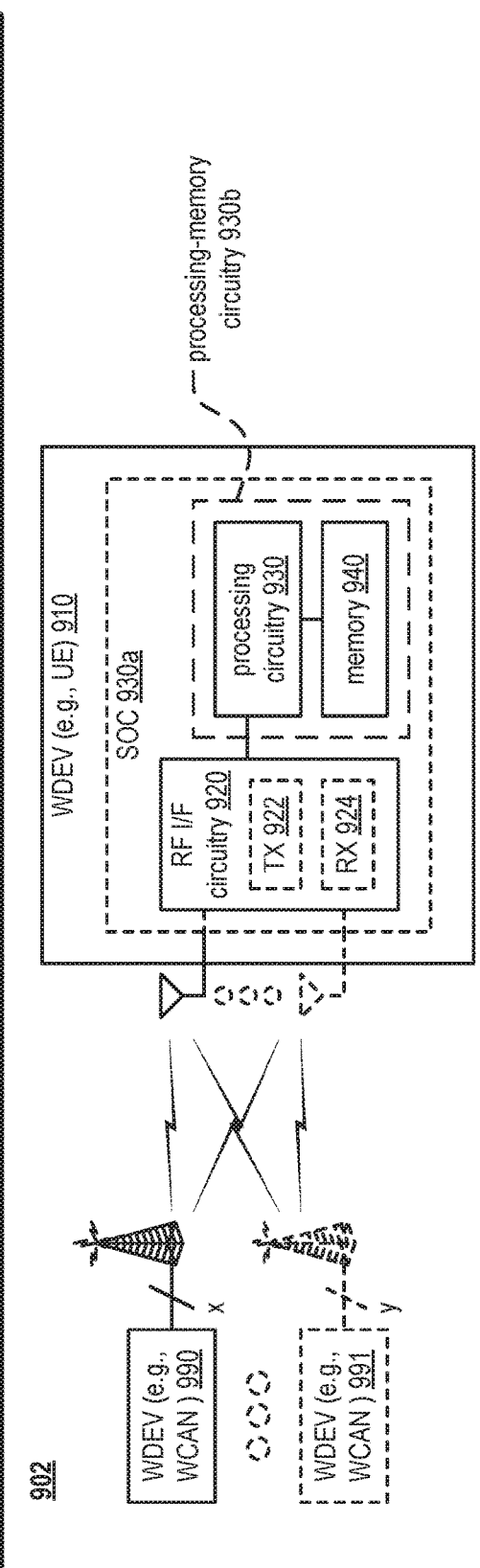
FIG. 9B is a diagram illustrating another embodiment of a wireless communication device (e.g., a UE).

FIG. 9B is a diagram illustrating another embodiment 902 of a wireless communication device (e.g., a UE). A wireless communication device 910 (e.g., which may be any UE such as described herein including with reference to FIG. 1) is in communication with another wireless communication device 990 (and/or any number of other wireless communication devices up through another wireless communication device 991) via a transmission medium. In some examples, the wireless communication device 990 is a WCAN device, and/or the wireless communication device 991 is another WCAN device. The wireless communication device 910 includes radio frequency (RF) interface (I/F) circuitry 920 to perform wireless transmitting and/or receiving of at least one signal, symbol, packet, frame, etc. (e.g., using a transmitter (TX) 922 and a receiver (RX) 924, which may be separate circuitry, modules, etc. or may be integrated into and part of the RF interface (I/F) circuitry 920) (note that general reference to packet or frame may be used interchangeably).

Generally speaking, the RF interface (I/F) circuitry 920 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 910 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 910 also includes a processing circuitry 930, and an associated memory 940, to execute various operations including interpreting at least one signal, symbol, packet, and/or frame transmitted to wireless communication device 990 and/or received from the wireless communication device 990 and/or wireless communication device 991. The wireless communication devices 910 and 990 (and/or 991) may be implemented using at least one integrated circuit in accordance with any desired configuration or combination of components, modules, etc. within at least one integrated circuit.

Also, the wireless communication devices (WDEVs) 910, 990, and/or 991 may each include or be coupled to one or more antennas [such as x antennas for WDEV 990 and y antennas for WDEV 991, where x and y are positive integers and may be the same positive integer or different positive integers] remote radio heads (RRHs), transmit/receive (TX/RX) points, etc. and/or one or more base stations (BSs), eNodeBs, etc. for transmitting and/or receiving of at least one packet and/or frame.

Also, in some examples, note that one or more of the processing circuitry 930, the RF interface (I/F) circuitry 920 (including the TX 922 and/or RX 924 thereof), and/or the memory 940 may be implemented in one or more "processing modules," "processing circuits," "processors," and/or "processing units" or their equivalents. Considering one example, a system-on-a-chip (SOC) 930a may be implemented to include the processing circuitry 930, the RF interface (I/F) circuitry 920 (including the TX 922 and/or RX 924 thereof), and the memory 940 (e.g., SOC 330a being a multifunctional, multi-module integrated circuit that includes multiple components therein). Considering another example, processing-memory circuitry 930b may be implemented to include functionality as performed by the processing circuitry 930 and the memory 940 yet the RF interface (I/F) circuitry 920 is a separate circuitry (e.g., processing-memory circuitry 930b is a single integrated circuit that performs functionality of a processing circuitry and a memory and is coupled to and also interacts with the RF interface (I/F) circuitry 920).

Considering even another example, two or more processing circuitries may be implemented to include the processing circuitry 930, the RF interface (I/F) circuitry 920 (including the TX 922 and/or RX 924 thereof), and the memory 940. In such examples, such a "processing circuitry" or "processing circuitries" (or "processor" or "processors") is/are configured to perform various operations, functions, communications, etc. as described herein. In general, the various elements, components, etc. shown within the device 910 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 910 includes both processing circuitry 930 and RF interface (I/F) circuitry 920 configured to perform various operations. In other examples, the device 910 includes SOC 930a configured to perform various operations. In even other examples, the device 910 includes processing-memory circuitry 930b configured to perform various operations. Generally, such operations include generating, transmitting, etc. signals intended for one or more other devices (e.g., device 990 through 991) and receiving, processing, etc. other signals received for one or more other devices (e.g., device 990 through 991).

In some examples, note that the wireless communication device 910 includes a communication interface that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 910 may be communicated via any of these types of communication systems.

Figure 10:
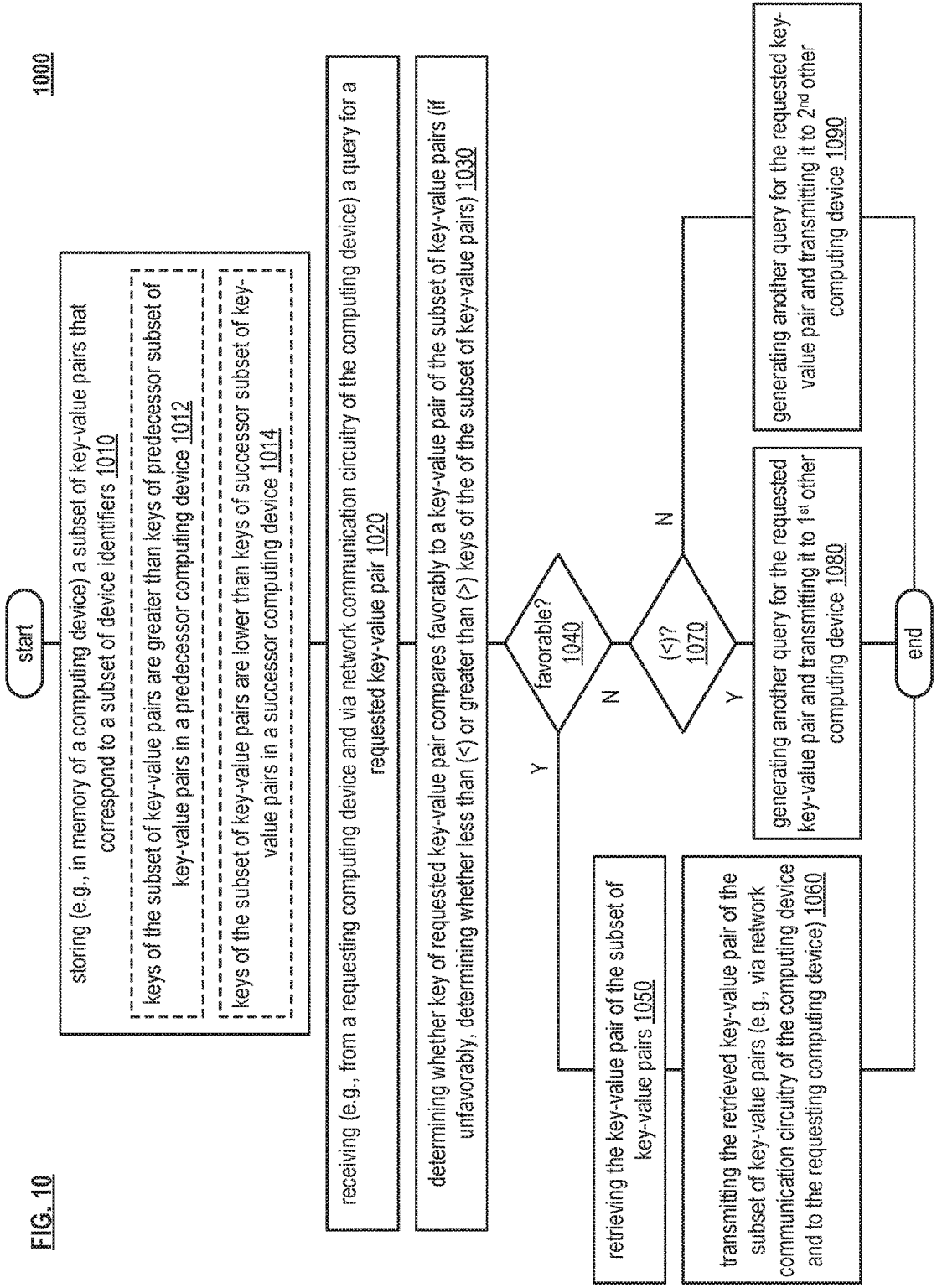
FIG. 10 is a diagram illustrating an embodiment of a method for execution by one or more communication devices.

FIG. 10 is a diagram illustrating an embodiment of a method 1000 for execution by one or more communication devices. The method 1000 begins by storing (e.g., in a memory of a computing device) a subset of a key-value pairs corresponding to a subset of a device identifiers associated with a communication network (block 1010). Other computing devices are implemented to store different respective subsets of key-value pairs corresponding to different respective subsets of device identifiers associated with the communication network. The computing devices are arranged based on a sorted key-order. The sorted key-order may be viewed as a logical ordering of the computing devices based on the respective subsets of key-value pairs stored in the computing devices. For example, keys of the subset of the key-value pairs stored in the computing device performing the method 1000 are greater than keys of a predecessor subset of key-value pairs stored within a predecessor computing device (block 1012), and keys of the subset of the key-value pairs stored in the computing device performing the method 1000 are lower than keys of a successor subset of key-value pairs stored within a successor computing device (block 1014).

The method 1000 continues by receiving (e.g., via network communication circuitry of the computing device that is configured to communicate via the communication network and from a requesting computing device) a query for a requested key-value pair that corresponds to a requested device identifier (block 1020).

The method 1000 then operates by determining whether key of requested key-value pair compares favorably to a key-value pair of the subset of key-value pairs (if unfavorably, determining whether less than (<) or greater than (>) keys of the of the subset of key-value pairs) (block 1030). When the key of the requested key-value pair compares favorably to a key-value pair of the subset of the key-value pairs in the memory (block 1040), the method 1000 branches and operates by retrieving the key-value pair from the memory (block 1050) and transmitting the key-value pair via the network communication circuitry to the requesting computing device (block 1060).

Alternatively, when the key of the requested key-value pair compares unfavorably to all of the subset of the key-value pairs in the memory (block 1040), the method 1000 branches and operates by generating another query for the requested key-value pair, when the key of the requested key-value pair is less than keys of the subset of the key-value pairs in the memory (block 1070), and transmitting that other query to a first other computing device that includes a first other subset of the key-value pairs that are lower than keys of the predecessor subset of the key-value pairs stored within the predecessor computing device (block 1080).

Alternatively, when the key of the requested key-value pair compares unfavorably to all of the subset of the key-value pairs in the memory (block 1040), the method 1000 branches and operates by generating another query for the requested key-value pair, when the key of the requested key-value pair is greater than keys of the subset of the key-value pairs in the memory (block 1070), and transmitting that other query to a second other computing device that includes a second other subset of the key-value pairs that are greater than keys of the successor subset of the key-value pairs stored within the successor computing device (block 1090).

Figure 11:
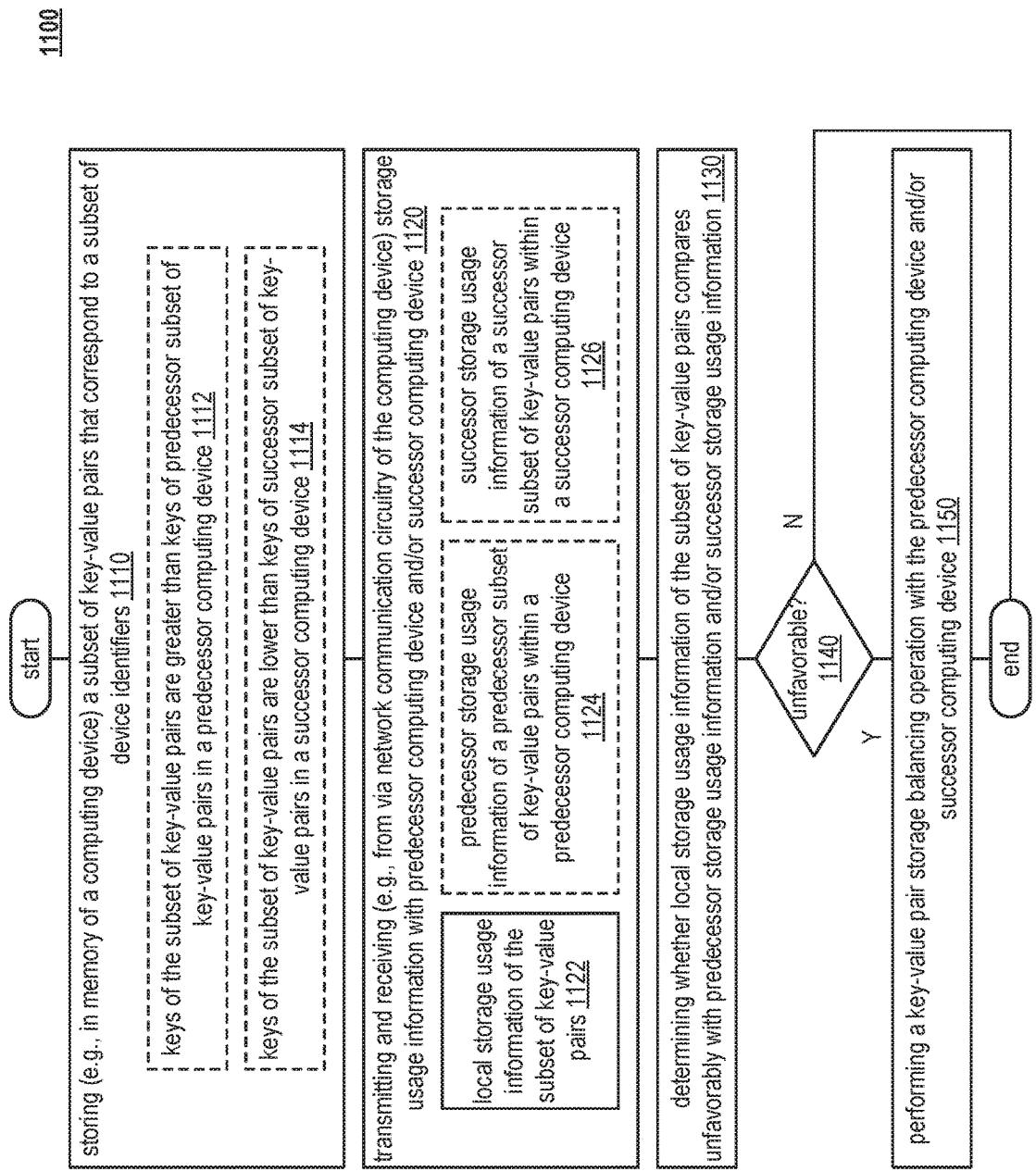
FIG. 11 is a diagram illustrating another embodiment of a method for execution by one or more communication devices.

FIG. 11 is a diagram illustrating another embodiment of a method 1100 for execution by one or more communication devices. The method 1100 begins by storing (e.g., in a memory of a computing device) a subset of a key-value pairs corresponding to a subset of a device identifiers associated with a communication network (block 1110). Other computing devices are implemented to store different respective subsets of key-value pairs corresponding to different respective subsets of device identifiers associated with the communication network. The computing devices are arranged based on a sorted key-order. The sorted key-order may be viewed as a logical ordering of the computing devices based on the respective subsets of key-value pairs stored in the computing devices. For example, keys of the subset of the key-value pairs stored in the computing device performing the method 1100 are greater than keys of a predecessor subset of key-value pairs stored within a predecessor computing device (block 1112), and keys of the subset of the key-value pairs stored in the computing device performing the method 1100 are lower than keys of a successor subset of key-value pairs stored within a successor computing device (block 1114).

The method 1100 continues by transmitting and receiving (e.g., via network communication circuitry of the computing device that is configured to communicate via the communication network) storage usage information with the predecessor computing device and/or the successor computing device (block 1120). In some examples, this involves transmitting (e.g., via the network communication circuitry) local storage usage information of the subset of the key-value pairs within the computing device to the predecessor computing device and/or the successor computing device. In such examples, this may also involve receiving (e.g., via the network communication circuitry) predecessor storage usage information of the predecessor subset of the key-value pairs within the predecessor computing device and/or successor storage usage information of the successor subset of the key-value pairs within the successor computing device.

In some examples, the storage usage information includes local storage usage information of the subset of the plurality of key-value pairs within the computing device (block 1122), and predecessor storage usage information of the predecessor subset of the plurality of key-value pairs within the predecessor computing device (block 1124) and/or successor storage usage information of the successor subset of the plurality of key-value pairs within the successor computing device (block 1126).

The method 1100 then operates by determining whether the local storage usage information of the subset of the plurality of key-value pairs within the computing device compares favorably or unfavorably to the predecessor storage usage information and/or the successor storage usage information (block 1140).

When the local storage usage information compares unfavorably with at least one of the predecessor storage usage information or the successor storage usage information, the method 1100 continues by performing a key-value pair storage balancing operation with the at least one of the predecessor computing device or the successor computing device (block 1150).

FIG. 12 is a diagram illustrating an embodiment 1200 of a node device 1210 and corresponding functionality as may be implemented within a communication system. Such a node device 1210 may be any such device including herein including a WCAN device, a UE, a RLOC, etc. and/or associated components such as with reference to FIG. 1, a computing device such as with reference to FIG. 2-7, a WCAN device such as with reference to FIG. 8A-8B, a UE such as with reference to FIG. 9A-9B as described herein and/or their equivalents.

The node device 1210 includes functionality therein to perform various operations and functions. The node device 1210 includes communication functionality 1212 to support communications with one or more other devices (e.g., any one or more of the devices as described above). Such communication may be to/from a communication network (e.g., the cloud network 199 of FIG. 1, the communication network 299 of FIG. 2, etc. as described herein and/or their equivalents). Such may be to/from a distributed DB (e.g., distributed cloud DB 190 of FIG. 1, distributed DB 290 of FIG. 2, etc. as described herein and/or their equivalents). In some examples, the communication functionality 1212 separately includes receive (RX) functionality 1212a and transmit (TX) functionality 1212b therein. In other examples, the communication functionality 1212 is a single transceiver operative to effectuate both receive (RX) functionality and transmit (TX) functionality. Such communication functionality 1212 (and/or associated receive (RX) functionality and transmit (TX) functionality) may be implemented to perform any of the various communication related operations and/or functions as described herein.

In addition, the node device 1210 includes storage functionality 1214. Such storage functionality 1214 is operative to store information. In some examples, such storage functionality 1214 involves storing key-value pairs in some embodiments including searching for keys of key-value pairs therein, providing information related to the key-value pairs stored therein, etc. Such storage functionality 1214 may be implemented to perform any of the various storage related operations and/or functions as described herein.

In addition, the node device 1210 includes processing functionality 1216. Such processing functionality 1216 is operative to perform operations including generation of various signals, messages, etc. (e.g., queries, requests, etc.). In some examples, such processing functionality 1216 involves comparing information with other information (e.g., comparing a key a key-value pair to another key of another key-value pair, comparing local storage usage information with predecessor storage usage information and/or successor storage usage information, etc.), searching for information (e.g., searching for a key-value pair among a number of key-value pairs stored by the storage functionality 1214, etc.), generating information (e.g., generated a query based on received information, that may have undergone processing as well, etc.). Such processing functionality 1216 may be implemented to perform any of the various processing related operations and/or functions as described herein.

In addition, the node device 1210 includes one or more of other functionality 1218. Various embodiments, examples, etc. of devices as described herein including those described above (e.g., a WCAN device, a UE, a RLOC, etc. and/or associated components such as with reference to FIG. 1, a computing device such as with reference to FIG. 2-7, a WCAN device such as with reference to FIG. 8A-8B, a UE such as with reference to FIG. 9A-9B as described herein and/or their equivalents) including various circuitries, modules, interfaces, etc. to perform various operations and/or functions. The one or more of other functionality 1218 may be implemented to perform any of the various other operations and/or functions as described herein including with respect to any of the other respective devices described herein.

Various aspects, embodiments, and/or examples of the invention include a group of computing devices that are implemented to store information in a distributed DB arranged. The computing devices may be viewed as forming ring of computing device or nodes logically (e.g., in a logical arrangement based on the content that the respective computing devices store). The computing devices respectively store a range of key-value pairs (e.g., stored from low key of a key-value pair to a high key of a key-value pair). Note that keys may be also stored in reversed format to allow for both prefix and suffix searching.

The computing devices are arranged with respect to a stored-key order such that the low-high (e.g., lowest key-value pair having a lowest key and highest key-value pair having a lowest key) of any given computing device is below the low-high key of its successor computing device and above the low-high key of its predecessor computing device (e.g., such that the respective subsets of key-value pairs stored in the respective computing devices are sorted, such as in accordance with a sorted key-order). Note that the ranges of key-value pairs within the computing devices may overlap for brief periods of time (e.g., there may be some duplicates of key-value pairs across adjacently located computing devices with respect to the sorted key-order). The ranges of key-value pairs within each of the computing devices can change over time by pushing low entries down to a predecessor computing device or high entries up to a down to a successor computing device. in accordance with load balancing operations as performed by the computing devices, automatic decisions to push key-value pairs is performed based on size comparisons (e.g., amount of storage of key-value pairs or storage usage information within the respective computing devices) between neighbors. This results in balancing of the subsets of key-value pairs among the computing devices of the distributed DB over time. Also, a computing device identifier vector (e.g., a vector of the nodes IP addresses of the computing devices forming the distributed DB) is stored locally on the computing devices of the distributed DB and is updated by the ring (e.g., based on addition(s) and/or deletion(s) of computing devices to/from the distributed DB). Insert/delete/query operations are done using a binary search over the IP's giving O(log(N)) read/write distributed behavior.

It is noted that the various operations and functions described within various methods herein may be performed within a communication device and/or wireless communication device (e.g., such as by a WCAN device, a UE, and/or other communication device and such operations may be performed by a processing circuitry, a communication interface, and a memory as may be implemented in any of a variety of configurations) and/or other components therein. Generally, a communication interface and processing circuitry (or alternatively a processing circuitry that includes communication interface functionality, components, circuitry, etc.) in a communication device and/or wireless communication device can perform such operations.

Those skilled in the art will appreciate that the above disclosure teaches a method of responding to queries for data, and a corresponding computing device for carrying out the method. The method comprises storing, in a memory of the computing device, a subset of a plurality of key-value pairs corresponding to a subset of a plurality of device identifiers associated with a communication network, wherein based on a sorted key-order of a plurality of computing devices including the computing device, the subset of the plurality of key-value pairs includes keys that are greater than keys of a predecessor subset of the plurality of key-value pairs stored within a predecessor computing device and that are lower than keys of a successor subset of the plurality of key-value pairs stored within a successor computing device; receiving, via network communication circuitry of the computing device that is configured to communicate via the communication network and from a requesting computing device, a query for a requested key-value pair that corresponds to a requested device identifier; when a key of the requested key-value pair compares unfavorably to all of the subset of the plurality of key-value pairs in the memory: generating a first other query for the requested key-value pair and transmitting, via the network communication circuitry, the first other query for the requested key-value pair to a first other computing device that includes a first other subset of the plurality of key-value pairs that are lower than keys of the predecessor subset of the plurality of key-value pairs stored within the predecessor computing device when the key of the requested key-value pair is less than keys of the subset of the plurality of key-value pairs in the memory; and generating a second other query for the requested key-value pair and transmitting, via the network communication circuitry, the second other query for the requested key-value pair to a second other computing device that includes a second other subset of the plurality of key-value pairs that are greater than keys of the successor subset of the plurality of key-value pairs stored within the successor computing device when the key of the requested key-value pair is greater than keys of the subset of the plurality of key-value pairs in the memory.

In an embodiment of this method, the method further comprises, when the key of the requested key-value pair compares favorably to a key-value pair of the subset of the plurality of key-value pairs in the memory, retrieving the key-value pair from the memory and transmitting the key-value pair via the network communication circuitry to the requesting computing device. In an embodiment, the plurality of computing devices including the computing device are arranged in accordance with a logical sequential ordering based on the sorted key-order of the plurality of computing devices, and wherein: a first number of computing devices are included within the logical sequential ordering between an initial computing device storing a lowest key-value pair having a lowest key based on the sorted key-order and the computing device; a second number of computing devices are included within the logical sequential ordering between the computing device and a final computing device storing a highest key-value pair having a highest lowest key based on the sorted key-order; the first other computing device is located approximately one-half of the first number of computing devices away from the computing device within the logical sequential ordering; and the second other computing device is located approximately one-half of the second number of computing devices away from the computing device within the logical sequential ordering. In an embodiment, the method may further comprise receiving, via the network communication circuitry and from another requesting computing device, a third other query for another requested key-value pair that corresponds to another requested device identifier; when another key of the another requested key-value pair compares favorably to another key-value pair of the subset of the plurality of key-value pairs in the memory, retrieving the another requested key-value pair from the memory and transmitting the another requested key-value pair to the another requesting computing device; when the another key of the another requested key-value pair compares unfavorably to all of the subset of the plurality of key-value pairs in the memory: generating a fourth other query for the requested key-value pair and transmitting, via the network communication circuitry, the fourth other query for the another requested key-value pair to a third other computing device that includes a third other subset of the plurality of key-value pairs that are greater than keys of the first other subset of the plurality of key-value pairs stored in the first other computing device when the another key of the another requested key-value pair is less than keys of the subset of the plurality of key-value pairs in the memory; and generating a fifth other query for the requested key-value pair and transmitting, via the network communication circuitry, the fifth other query for the another requested key-value pair to a fourth other computing device that includes a fourth other subset of the plurality of key-value pairs that are less than keys of the second other subset of the plurality of key-value pairs stored in the second other computing device when the another key of the another requested key-value pair is greater than keys of the subset of the plurality of key-value pairs in the memory. In another embodiment, the method may comprise the additional steps of receiving, via the network communication circuitry and from a third other computing device of the plurality of computing devices that is adjacently located to the computing device based on the sorted key-order, remote storage usage information of the third other computing device; when local storage usage information of the computing device compares unfavorably with the remote storage usage information of the third other computing device, transmitting, via the network communication circuitry, at least one of the subset of the plurality of key-value pairs to the third other computing device of the plurality of computing devices to be stored therein and deleting the at least one of the subset of the plurality of key-value pairs from the memory; and when local storage usage information of the computing device compares favorably with the remote storage usage information of the third other computing device, receiving, via the network communication circuitry, at least one other key-value pair of the plurality of key-value pairs from the third other computing device of the plurality of computing devices and storing the at least one other key-value pair in the memory. In another embodiment, the method may further comprise transmitting, via the network communication circuitry to at least one of a third other computing device of the plurality of computing devices that is adjacently located to the computing device in a first direction based on the sorted key-order or a fourth other computing device of the plurality of computing devices that is adjacently located to the computing device in a second direction based on the sorted key-order, local storage usage information of the computing device that specifies full storage capacity of the computing device; and transmitting, via the network communication circuitry, all of the subset of the plurality of key-value pairs to the at least one of the third other computing device or the fourth other computing device to be stored therein. In a further embodiment, the method may comprise transmitting, via the network communication circuitry and to at least one of a third other computing device of the plurality of computing devices that is adjacently located to the computing device in a first direction based on the sorted key-order or a fourth other computing device of the plurality of computing devices that is adjacently located to the computing device in a second direction based on the sorted key-order, local storage usage information of the computing device that specifies empty storage capacity of the computing device; and receiving, via the network communication circuitry, the subset of the plurality of key-value pairs from the at least one of the third other computing device or the fourth other computing device to be stored in the memory. In another embodiment, a key of a key-value pair of the plurality of key-value pairs can correspond to at least one of a User Equipment (UE), a username, a phone number, an International Mobile Subscriber Identity (IMSI), or an International Mobile Equipment Identity (IMEI) In a further embodiment, a value of a key-value pair of the plurality of key-value pairs corresponds to at least one of a location associated with key of the key-value pair, an Internet Protocol (IP) address associated with the key of the key-value pair, a port address-IP address pair associated with the key of the key-value pair, a base station (BS) associated with the key of the key-value pair, a wireless local area network (WLAN) associated with the key of the key-value pair, or a local area network (LAN) associated with the key of the key-value pair.

Those skilled in the art will appreciate that these embodiments may be based off the method described above, but may also be combined with each other in a variety of different ways.

As will be understood, the above teachings provide for a node in a storage network that contains a set of records, each of which has an associated index. The node has knowledge of the highest and lowest indices associated with the stored records. If a request is received, the node can determine whether it has the record by determining if the index associated with the requested record is between the highest and lowest indices. When the record is available, the index of the requested record will fall within the range of stored indices (i.e. above the lowest index and below the highest index). The record can be retrieved and transmitted. When the record is outside the bounds of the stored indices, the node will generate a new request that can be transmitted to a second node in the storage network. The new request can still specify the original requesting party (so that the response can be directed to the original requesting party), but will also include a boundary condition. The node will typically set itself as either an upper or lower bound for subsequent searches. When a first request is generated, the upper and lower bounds may be set to be the extremities of the ordered storage network. By replacing the upper or lower bound, and then selecting a second node between the modified upper and lower bounds, the request can be sent to a node with a likelihood of storing the requested record. In some embodiments this may allow for what is effectively a binary search through a distributed database.

A method to implement such a process has been taught and may comprise receiving, at a node in a distributed storage network, a request for a record comprising an index associated with the requested record; and in response to a determination that the requested record is outside a range of indices associated with stored records, transmitting to a second node in the distributed storage network, selected in accordance with a determination of whether the index associated with the requested record is above a highest index in range of indices or below a lowest index in the range of indices, a request for the record. In an embodiment, the transmitted request is determined includes a search boundary condition determined in accordance with the position of the node in the distributed storage network.

In an optional embodiment, the search boundary condition may specify a lower limit on a subsequent selection of a node when the index associated with the requested record is above the highest index. In a further optional embodiment, the second node is selected from nodes in the distributed storage network above the lower limit specified by the boundary condition and an upper limit specified by a second boundary condition. In another optional embodiment, the second node is selected to be a midpoint between the upper limit and lower limit.

In an embodiment, the search boundary condition specifies an upper limit on a subsequent selection of a node when the index associated with the requested record is below the lowest index. Optionally, the search boundary condition specifies an upper limit on a subsequent selection of a node when the index associated with the requested record is below the lowest index. In another optional embodiment, the second node is selected from nodes in the distributed storage network below the upper limit specified by the boundary condition and a lower limit specified by a second boundary condition. In a further optional embodiment, the second node is selected to be a midpoint between the upper limit and lower limit.

In another embodiment, a balancing operation can be provided. Each node knows the address of its neighboring node in the ordered storage network. A node can attempt to balance a resource usage with its neighboring nodes. In one example, the resource to be balanced could be storage capacity. In another example, it could be processor availability or input/output capacity, or any other such capacity as would be apparent to those skilled in the art. Each node can measure its usage of the resource in question. A given node can then compare its resource usage to its adjacent node. This may be achieved by requesting that an adj acent node provide a usage report. Upon receipt of a report from a neighboring node a comparison can be performed. In some examples, the nodes may exchange resource usage reports with the neighboring nodes at fixed intervals. If a node determines that there is an imbalance (in some cases an imbalance in excess of a defined threshold), it moves a number of stored records to the neighboring node. If records are to be moved to the node with a higher set of indexed records (e.g. the lowest index of the neighbor exceeds the highest index of the node), then the records to be moved will be those having the highest indices. Conversely, if the imbalance results in moving records to a neighboring node with a lower set of indexed records (e.g. the highest index of the neighbor exceeds the lowest index of a record stored at the node), then the records to be moved will be those having the lowest indices. If all nodes in the distributed storage network carry out this method, then the resource usage can be relatively evenly spread across the network.

If the resource imbalance is only remedied when a threshold is exceeded, one embodiment may include a node checking with second or higher order neighbors (e.g. the node that neighbors a neighboring node). This check may be done to ensure that the same balancing operation is not being impeded by a series of adjacent nodes each being differently loaded, but each difference being less than the threshold. If a first node has higher resource usage than a second node, which in turn has higher resource usage than a third node, which in turn has higher resource usage than a fourth node, etc. there may be an imbalance detected that will result in a condition in which the thresholds are modified or ignored. It should be understood that in an alternate embodiment, instead of a node pushing data to a node with lower utilization, the nodes in the distributed storage network may be configured to pull records from their neighbor to at least partially rectify a detected imbalance.

By using this method, a new node can be introduced by telling all existing nodes of its location in the distributed storage network. The balancing operation can then be used to fill the new node and reduce resource utilization in the existing nodes. Similarly, a node can be removed by artificially setting its resource utilization to a very high state. This will cause the node to empty its records to at least one adjacent node (which in turn will push other records to its neighbors if necessary). When the node is empty it can be removed, and the nodes in the network can be adjusted to remove that node from the topology.

Examples of some components may include one or more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A computing device comprising:
   network communication circuitry configured to communicate via a communication network;
   memory that stores operational instructions; and
   processing circuitry that is coupled to the network communication circuitry and the memory, wherein the processing circuitry, when executing the operational instructions, is configured to:
      store, in the memory, a subset of a plurality of key-value pairs corresponding to a subset of a plurality of device identifiers associated with the communication network, wherein based on a sorted key-order of a plurality of computing devices including the computing device, and wherein the subset of the plurality of key-value pairs includes keys that are greater than keys of a predecessor subset of the plurality of key-value pairs stored within a predecessor computing device and that are lower than keys of a successor subset of the plurality of key-value pairs stored within a successor computing device;
      transmit, via the network communication circuitry, local storage usage information of the subset of the plurality of key-value pairs within the computing device to at least one of the predecessor computing device or the successor computing device;
      receive, via the network communication circuitry, at least one of predecessor storage usage information of the predecessor subset of the plurality of key-value pairs within the predecessor computing device or successor storage usage information of the successor subset of the plurality of key-value pairs within the successor computing device; and
      when the plurality of key-value pairs of at least one of the predecessor storage usage information or the successor storage usage information is outside a range of the plurality of key-value pairs of the local storage usage information, perform a key-value pair storage balancing operation with the at least one of the predecessor computing device or the successor computing device.

2. The computing device of claim 1, wherein the processing circuitry, when executing the operational instructions, is further configured to:
   transmit, via the network communication circuitry, the local storage usage information to the predecessor computing device and to the successor computing device;
   receive, via the network communication circuitry, the predecessor storage usage information from the predecessor computing device;
   receive, via the network communication circuitry, the successor storage usage information from the successor computing device; and
   when the plurality of key-value pairs of at least one of the predecessor storage usage information or the successor storage usage information is outside the range of the plurality of key-value pairs of the local storage usage information, perform at least one of:
      transmit, via the network communication circuitry, at least one of a first key-value pair of the subset of the plurality of key-value pairs to the predecessor computing device or a second key-value pair of the subset of the plurality of key-value pair the successor computing device to be stored therein; or
      receive, via the network communication circuitry, at least one of a predecessor key-value pair of the predecessor subset of the plurality of key-value pairs from the predecessor computing device or a successor key-value pair of the successor subset of the plurality of key-value pairs from the successor computing device to be stored within the computing device.

3. The computing device of claim 2, wherein the processing circuitry, when executing the operational instructions, is further configured to:
   update the local storage usage information to generate updated local storage usage information based on an updated subset of the plurality of key-value pairs to be stored in the computing device including identification of a lowest key value and a highest key value therein; and
   transmit, via the network communication circuitry, the updated local storage usage information to the predecessor computing device and to the successor computing device.

4. The computing device of claim 1, wherein the processing circuitry, when executing the operational instructions, is further configured to:
   transmit, via the network communication circuitry, full local storage usage information of the computing device that specifies full storage capacity of the computing device to the at least one of the predecessor computing device or the successor computing device; and
   transmit, via the network communication circuitry, all of the subset of the plurality of key-value pairs to the at least one of the predecessor computing device or the successor computing device to be stored therein.

5. The computing device of claim 1, wherein the processing circuitry, when executing the operational instructions, is further configured to:
   transmit, via the network communication circuitry, full local storage usage information of the computing device that specifies empty storage capacity of the computing device to the at least one of the predecessor computing device or the successor computing device; and
   receive, via the network communication circuitry, the subset of the plurality of key-value pairs from the at least one of the predecessor computing device or the successor computing device to be stored in the memory.

6. The computing device of claim 1, wherein the processing circuitry, when executing the operational instructions, is further configured to:
   perform the key-value pair storage balancing operation with the at least one of the predecessor computing device or the successor computing device until a key-value pair percentage difference between key-value pairs stored in the computing device and at least one of first other key-value pairs stored in the predecessor computing device or second other key-value pairs stored in the successor computing device is less than a threshold.

7. The computing device of claim 1, wherein a key of a key-value pair of the plurality of key-value pairs corresponds to at least one of a User Equipment (UE), a username, a phone number, an International Mobile Subscriber Identity (IMSI), or an International Mobile Equipment Identity (IMEI).

8. The computing device of claim 1, wherein a value of a key-value pair of the plurality of key-value pairs corresponds to at least one of a location associated with key of the key-value pair, an Internet Protocol (IP) address associated with the key of the key-value pair, a port address-IP address pair associated with the key of the key-value pair, a base station (BS) associated with the key of the key-value pair, a wireless local area network (WLAN) associated with the key of the key-value pair, or a local area network (LAN) associated with the key of the key-value pair.

9. A method for execution by a computing device, the method comprising:
   storing, in a memory of the computing device, a subset of a plurality of key-value pairs corresponding to a subset of a plurality of device identifiers associated with a communication network, wherein based on a sorted key-order of a plurality of computing devices including the computing device, and wherein the subset of the plurality of key-value pairs includes keys that are greater than keys of a predecessor subset of the plurality of key-value pairs stored within a predecessor computing device and that are lower than keys of a successor subset of the plurality of key-value pairs stored within a successor computing device;
   transmitting, via network communication circuitry of the computing device, local storage usage information of the subset of the plurality of key-value pairs within the computing device to at least one of the predecessor computing device or the successor computing device;
   receiving, via the network communication circuitry, at least one of predecessor storage usage information of the predecessor subset of the plurality of key-value pairs within the predecessor computing device or successor storage usage information of the successor subset of the plurality of key-value pairs within the successor computing device; and
   when the plurality of key-value pairs of at least one of the predecessor storage usage information or the successor storage usage information is outside a range of the plurality of key-value pairs of the local storage usage information, perform a key-value pair storage balancing operation with the at least one of the predecessor computing device or the successor computing device.

10. The method of claim 9 further comprising:
transmitting, via the network communication circuitry, the local storage usage information to the predecessor computing device and to the successor computing device;
receiving, via the network communication circuitry, the predecessor storage usage information from the predecessor computing device;
receiving, via the network communication circuitry, the successor storage usage information from the successor computing device; and
when the plurality of key-value pairs of at least one of the predecessor storage usage information or the successor storage usage information is outside the range of the plurality of key-value pairs of the local storage usage information, perform at least one of:
 transmitting, via the network communication circuitry, at least one of a first key-value pair of the subset of the plurality of key-value pairs to the predecessor computing device or a second key-value pair of the subset of the plurality of key-value pair the successor computing device to be stored therein; or
 receiving, via the network communication circuitry, at least one of a predecessor key-value pair of the predecessor subset of the plurality of key-value pairs from the predecessor computing device or a successor key-value pair of the successor subset of the plurality of key-value pairs from the successor computing device to be stored within the computing device.

11. The method of claim 10 further comprising:
updating the local storage usage information to generate updated local storage usage information based on an updated subset of the plurality of key-value pairs to be stored in the computing device including identification of a lowest key value and a highest key value therein; and
transmitting, via the network communication circuitry, the updated local storage usage information to the predecessor computing device and to the successor computing device.

12. The method of claim 9 further comprising:
transmitting, via the network communication circuitry, full local storage usage information of the computing device that specifies full storage capacity of the computing device to the at least one of the predecessor computing device or the successor computing device; and
transmitting, via the network communication circuitry, all of the subset of the plurality of key-value pairs to the at least one of the predecessor computing device or the successor computing device to be stored therein.

13. The method of claim 9 further comprising:
transmitting, via the network communication circuitry, full local storage usage information of the computing device that specifies empty storage capacity of the computing device to the at least one of the predecessor computing device or the successor computing device; and
receiving, via the network communication circuitry, the subset of the plurality of key-value pairs from the at least one of the predecessor computing device or the successor computing device to be stored in the memory.

14. The method of claim 9 further comprising:
performing the key-value pair storage balancing operation with the at least one of the predecessor computing device or the successor computing device until a key-value pair percentage difference between key-value pairs stored in the computing device and at least one of first other key-value pairs stored in the predecessor computing device or second other key-value pairs stored in the successor computing device is less than a threshold.

15. The method of claim 9, wherein a key of a key-value pair of the plurality of key-value pairs corresponds to at least one of a User Equipment (UE), a username, a phone number, an International Mobile Subscriber Identity (IMSI), or an International Mobile Equipment Identity (IMEI).

16. The method of claim 9, wherein a value of a key-value pair of the plurality of key-value pairs corresponds to at least one of a location associated with key of the key-value pair, an Internet Protocol (IP) address associated with the key of the key-value pair, a port address-IP address pair associated with the key of the key-value pair, a base station (BS) associated with the key of the key-value pair, a wireless local area network (WLAN) associated with the key of the key-value pair, or a local area network (LAN) associated with the key of the key-value pair.

* * * * *